(12) United States Patent
Miyasako

(10) Patent No.: US 9,467,622 B2
(45) Date of Patent: Oct. 11, 2016

(54) IMAGE CAPTURING APPARATUS, IMAGE PROCESSING APPARATUS, AND METHOD OF CONTROLLING IMAGE CAPTURING APPARATUS TO CORRECT DISTORTION

(71) Applicant: CANON KABUSHIKI KAISHA, Tokyo (JP)

(72) Inventor: Kenichi Miyasako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 14/020,070

(22) Filed: Sep. 6, 2013

(65) Prior Publication Data

US 2014/0078327 A1    Mar. 20, 2014

(30) Foreign Application Priority Data

Sep. 20, 2012 (JP) ................. 2012-207529

(51) Int. Cl.
*H04N 5/232* (2006.01)
*H04N 5/262* (2006.01)
*H04N 5/353* (2011.01)

(52) U.S. Cl.
CPC ...... *H04N 5/23267* (2013.01); *H04N 5/23258* (2013.01); *H04N 5/2628* (2013.01); *H04N 5/3532* (2013.01)

(58) Field of Classification Search
CPC .............. H04N 5/23258; H04N 5/23267; H04N 5/3532; H04N 5/2628
See application file for complete search history.

(56) References Cited

U.S. PATENT DOCUMENTS

| 7,936,945 B2 * | 5/2011 | Soinio ............... G06T 5/006 382/100 |
| 2007/0002145 A1 * | 1/2007 | Furukawa ............... 348/207.99 |
| 2007/0188619 A1 * | 8/2007 | Kurata ............... 348/208.99 |
| 2010/0033584 A1 * | 2/2010 | Watanabe ............... 348/208.13 |

FOREIGN PATENT DOCUMENTS

| JP | 06-090398 A | 3/1994 |
| JP | 2005-269419 A | 9/2005 |
| JP | 2007-264074 A | 10/2007 |
| JP | 2008-217526 A | 9/2008 |
| JP | 2008-259076 A | 10/2008 |
| JP | 2012-231262 A | 11/2012 |

\* cited by examiner

*Primary Examiner* — Twyler Haskins
*Assistant Examiner* — Carramah J Quiett
(74) *Attorney, Agent, or Firm* — Cowan, Liebowitz & Latman, P.C.

(57) ABSTRACT

An image capturing apparatus includes an image capturing unit configured to change, between lines, a timing to receive light of an object image formed by an imaging optical system and accumulate charges, a storage unit configured to store a captured image, a shake detection unit configured to detect a shake, an image stabilization unit configured to optically correct an image blur caused by the shake, a distortion correction amount calculation unit configured to calculate, based on the output of the shake detection unit, a distortion correction amount used to correct a distortion caused in the image by the shake during charge accumulation of the image capturing unit, and a correction unit configured to correct the image stored in the storage unit based on the distortion correction amount.

12 Claims, 16 Drawing Sheets

IMAGE AFTER ROLLING SHUTTER DISTORTION CORRECTION

IMAGE AFTER ROLLING SHUTTER DISTORTION CORRECTION

OUTPUT IMAGE

OUTPUT IMAGE

IMAGE AFTER ROLLING SHUTTER DISTORTION CORRECTION

IMAGE AFTER ROLLING SHUTTER DISTORTION CORRECTION

OUTPUT IMAGE

CAPTURED IMAGE

OUTPUT IMAGE

IMAGE CAPTURING APPARATUS, IMAGE PROCESSING APPARATUS, AND METHOD OF CONTROLLING IMAGE CAPTURING APPARATUS TO CORRECT DISTORTION

BACKGROUND OF THE INVENTION

1. Field of the Invention

The present invention relates to a technique of, in an image processing apparatus, correcting a distortion of a captured image caused by a shake of an image capturing apparatus using a method of electronically deforming an image.

2. Description of the Related Art

In recent years, CMOS image pickup devices are rapidly proliferating as image pickup devices used in image capturing apparatuses. When capturing a moving image using a CMOS image pickup device, control is performed to read charges accumulated on the line basis from the upper portion to the lower portion of the CMOS image pickup device. This read method is called a rolling shutter method in which the read timing changes between the upper portion and the lower portion of the image pickup device. If a shake occurs in the image capturing apparatus, and the object position moves on the imaging plane, a distortion (rolling shutter distortion) occurs in the captured image due to the difference of the charge read timing in the image pickup device.

As a method of correcting such a rolling shutter distortion, there is proposed a method of discretely acquiring the amounts of shakes that occur in the image capturing apparatus so as to synchronize with the read timings of the CMOS image pickup device and correcting the rolling shutter distortion based on the acquired shake amounts (for example, Japanese Patent Laid-Open No. 2007-264074).

In the above-described related art, however, the reference line of rolling shutter distortion correction (a line where the read position does not change in rolling shutter distortion correction) is not clear, and the following problem sometimes arises.

FIG. 14A is a view for explaining a method of correcting a rolling shutter distortion that has occurred in an object due to a shake applied to an image capturing apparatus. The range of the outermost rectangle in FIG. 14A indicates the range of the entire captured image of the image capturing apparatus. The large dotted rectangle in the captured image indicates the image read range without a rolling shutter distortion. The small dotted rectangle indicates the shape of the object without a rolling shutter distortion. The small rhombic pattern in FIG. 14A indicates a state in which a rolling shutter distortion occurs due to application of a shake to the image capturing apparatus, and the captured object shrinks in the vertical direction and distorts obliquely.

Rolling shutter distortion correction is performed by changing the image read range in accordance with the rolling shutter distortion, as indicated by the large rhombic pattern in FIG. 14A. At this time, the reference line of rolling shutter distortion correction is set to the uppermost line of the captured image in FIG. 14A. In FIG. 14A, on the lines under the reference line, the read position is changed rightward relative to the reference line, thereby performing correction to return the image that has obliquely distorted to the undistorted state. Additionally, on the lines under the reference line, the read line position is gradually shifted upward, thereby performing correction to enlarge the image that has shrunk in the vertical direction and return it to the original size. The object that has distorted to a rhombus in FIG. 14A can thus be returned to the original shape (in this case, a rectangle).

FIG. 14B is a view showing an output obtained by performing the above-described rolling shutter distortion correction. The range of the outermost rectangle in FIG. 14B indicates the range of the output image after the rolling shutter distortion correction. The solid square pattern in the output image indicates the object obtained by performing the rolling shutter distortion correction for the object distorted into a rhombus in FIG. 14A. The dotted square pattern in FIG. 14B indicates the object on the output image when the image read range (large dotted rectangle in FIG. 14A) without a rolling shutter distortion in FIG. 14A is read.

In FIG. 14A, assume that the center position of the object distorted into a rhombus due to the rolling shutter distortion and the center position of the square object without a rolling shutter distortion are the same on the captured image. This assumption is placed for the descriptive convenience because, actually, a shake of the image capturing apparatus makes the object position vary on the captured image. At this time, when the rolling shutter distortion correction is performed while setting the reference line to the position shown in FIG. 14A, the object position shifts on the output image, as indicated by the solid and dotted squares in FIG. 14B. That is, without correct setting of the reference line of rolling shutter distortion correction, the object position shifts to result in a new blur even if the distorted object can be returned to the original shape.

SUMMARY OF THE INVENTION

The present invention has been made in consideration of the above-described problem, and provides an image processing apparatus capable of appropriately setting the reference line of rolling shutter distortion correction and capturing a high-quality video with less influence of a shake, an image capturing apparatus including the same, and a method of controlling the image processing apparatus.

According to the first aspect of the present invention, there is provided an image capturing apparatus comprising: an image capturing unit configured to change, between lines, a timing to receive light of an object image formed by an imaging optical system and accumulate charges; a storage unit configured to store an image captured by the image capturing unit; a shake detection unit configured to detect a shake; an image stabilization unit configured to optically correct an image blur caused by the shake based on an output of the shake detection unit; a distortion correction amount calculation unit configured to calculate, based on the output of the shake detection unit, a distortion correction amount used to correct a distortion caused in the image by the shake during charge accumulation of the image capturing unit; and a correction unit configured to correct the image stored in the storage unit based on the distortion correction amount, wherein the distortion correction amount calculation unit calculates the distortion correction amount using, as a reference, a position set based on a position of the optical correction unit at a time substantially at a center between a start and an end of charge accumulation of the image capturing unit.

According to the second aspect of the present invention, there is provided an apparatus for performing image processing for an image captured by an image capturing apparatus including an image capturing unit configured to change, between lines, a timing to receive light of an object image formed by an imaging optical system and accumulate charges, a shake detection unit configured to detect a shake, and an image stabilization unit configured to optically correct an image blur caused by the shake based on an output of the shake detection unit, comprising: a storage unit configured to store the image captured by the image capturing apparatus, information of the shake, and a position of the image stabilization unit when capturing the image; a distortion correction amount calculation unit configured to calculate, based on the output of the shake detection unit, a distortion correction amount used to correct a distortion caused in the image by the shake during charge accumulation of the image capturing unit; and a correction unit configured to correct the image stored in the storage unit based on the distortion correction amount, wherein the distortion correction amount calculation unit calculates the distortion correction amount using, as a reference, a position set based on a position of the optical correction unit at a time substantially at a center between a start and an end of charge accumulation of the image capturing unit.

According to the third aspect of the present invention, there is provided a method of controlling an image capturing apparatus including an image capturing unit configured to change, between lines, a timing to receive light of an object image formed by an imaging optical system and accumulate charges, and a storage unit configured to store an image captured by the image capturing unit, the method comprising: a shake detection step of detecting a shake; an image stabilization step of optically correcting an image blur caused by the shake based on an output in the shake detection step; a distortion correction amount calculation step of calculating, based on the output in the shake detection step, a distortion correction amount used to correct a distortion caused in the image by the shake during charge accumulation of the image capturing unit; and a correction step of correcting the image stored in the storage unit based on the distortion correction amount, wherein in the distortion correction amount calculation step, the distortion correction amount is calculated using, as a reference, a position set based on a position of the optical correction unit at a time substantially at a center between a start and an end of charge accumulation of the image capturing unit.

Further features of the present invention will become apparent from the following description of exemplary embodiments with reference to the attached drawings.

DESCRIPTION OF THE EMBODIMENTS

The embodiments of the present invention will now be described in detail with reference to the accompanying drawings.

(First Embodiment)

Figure 1:
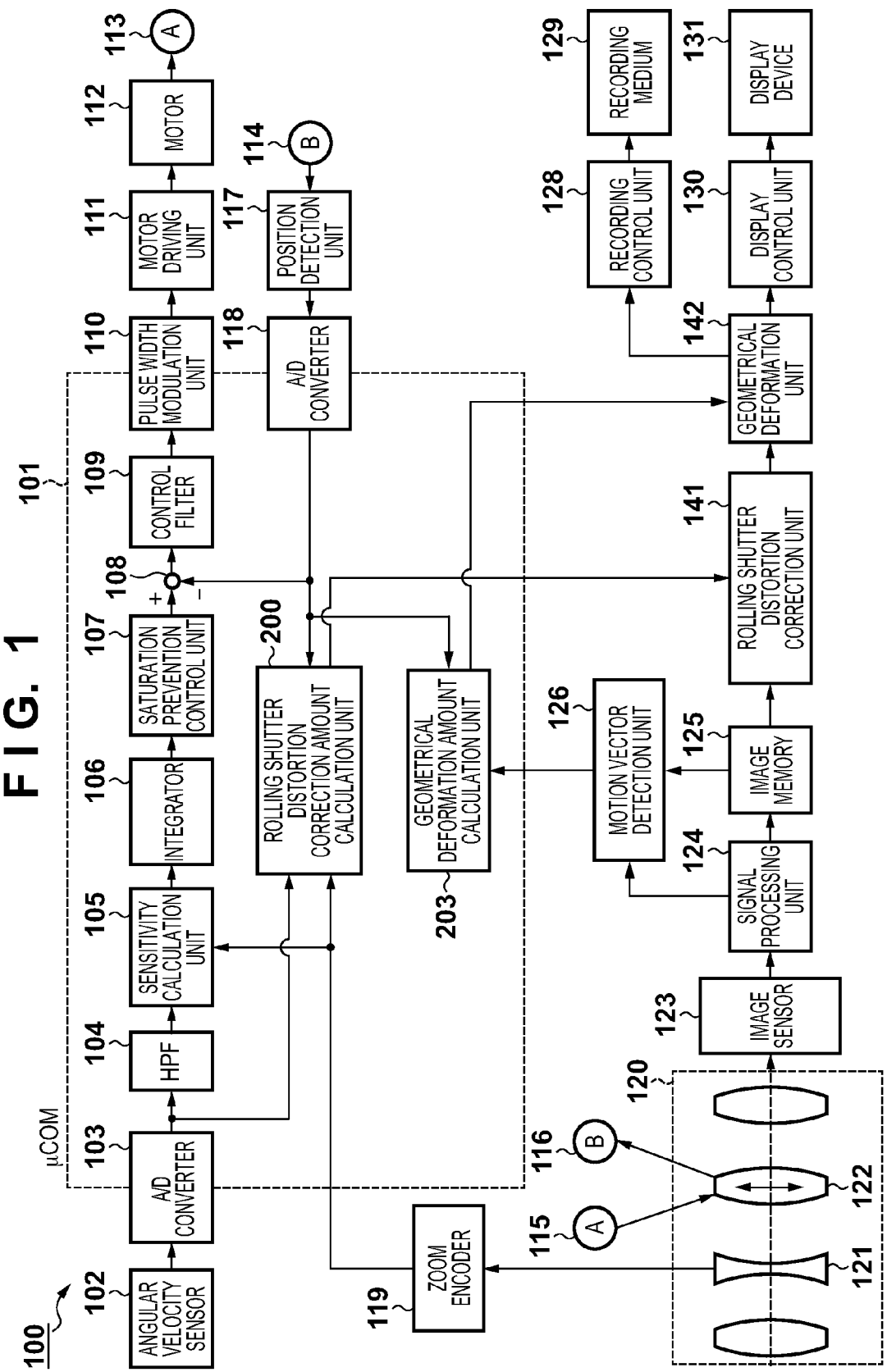
FIG. 1 is a block diagram showing an example of the arrangement of an image capturing apparatus according to the first embodiment.

FIG. 1 is a block diagram showing of the arrangement of a video camera that is an example of an image capturing apparatus according to the first embodiment of the present invention. The components of an image capturing apparatus 100 shown in FIG. 1 and examples of their operations will be described below in detail.

An angular velocity sensor 102 serving as a shake detection means detects a shake applied to the image capturing apparatus 100 as an angular velocity signal and supplies the angular velocity signal to an A/D converter 103. The angular velocity sensor 102 having the z-axis in the optical axis direction, the y-axis upward in the vertical direction, and the x-axis in a direction perpendicular to the y- and z-axes detects angular changes at least in the pitch (about the x-axis) direction and the yaw (about the y-axis) direction. The A/D converter 103 converts the angular velocity signal from the angular velocity sensor 102 into a digital signal and supplies it to an HPF 104 and a rolling shutter (RS) distortion correction amount calculation unit (distortion correction amount calculation unit) 200 in a μCOM 101 as angular velocity data. RS is short for a rolling shutter.

The HPF 104 has a function of changing its characteristic in an arbitrary frequency band. The HPF 104 outputs a signal in a high frequency band by cutting off low-frequency components contained in the angular velocity data from the A/D converter 103. When a large angular change such as panning occurs in the image capturing apparatus 100, the cutoff frequency of the HPF 104 is set to a value higher than that for a small angular change.

An imaging optical system 120 performs an operation such as zooming or focusing and forms an object image on an image pickup device 123. A correction optical system 122 in the imaging optical system 120 is, for example, a shift lens which is an optical system capable of correcting a blur by moving in a direction perpendicular to the optical axis and thus deflecting the optical axis (optical correction means). When the correction optical system 122 moves, a translational image blur of the object on the imaging plane, which is caused by the shake of the image capturing apparatus 100, is corrected. The image of the object is formed on the image pickup device 123, and the light of the image is received.

A zoom encoder 119 detects the position (zoom position) of a magnification optical system 121 in the imaging optical system 120 and outputs it to a sensitivity calculation unit 105 and the rolling shutter distortion correction amount calculation unit 200 in the μCOM 101. The sensitivity calculation unit 105 calculates, in accordance with the output of the zoom encoder 119, a coefficient used to calculate the optimum driving amount of the correction optical system 122 for each zoom position, multiplies the output from the HPF 104 by the coefficient, and supplies the result to an integrator 106.

The integrator 106 has a function of changing its characteristic in an arbitrary frequency band. The integrator 106 integrates the output from the sensitivity calculation unit 105 and supplies the result to a saturation prevention control unit 107. When a large angular change such as panning occurs in the image capturing apparatus 100, the time constant of the integrator 106 is set to a value shorter than that for a small angular change.

When the output of the integrator 106 is larger than a predetermined limit value, the saturation prevention control unit 107 limits the output of the integrator 106 to a value equal to or smaller than the limit value, and supplies the limited output to a subtracter 108.

The subtracter 108 subtracts digital data obtained by causing an A/D converter 118 to A/D-convert the output of a position detection unit 117 for detecting the position of the correction optical system 122 from the output of the saturation prevention control unit 107 and supplies deviation data as the result to a control filter 109. A terminal B 114 and a terminal B 116 indicate that they are electrically connected to each other.

The control filter 109 includes an amplifier that amplifies input data by a predetermined gain, and a phase compensation filter. The deviation data supplied from the subtracter 108 undergoes signal processing by the amplifier and phase compensation filter in the control filter 109 and is then output to a pulse width modulation unit 110.

The pulse width modulation unit 110 modulates the data supplied through the control filter 109 to a waveform (that is, PWM waveform) that changes the duty ratio of a pulse wave, and supplies the waveform to a motor driving unit 111. A motor 112 is a voice coil motor used to drive the correction optical system 122. When the motor 112 is driven by the motor driving unit 111, the correction optical system 122 moves in the direction perpendicular to the optical axis. A terminal A 113 and a terminal A 115 indicate that they are electrically connected to each other.

The position detection unit 117 includes a magnet and a Hall sensor provided at a position facing the magnet. The position detection unit 117 detects the moving amount of the correction optical system 122 in the direction perpendicular to the optical axis and supplies the detection result to the above-described subtracter 108 via the A/D converter 118. This constitutes a feedback control system which causes the moving amount of the correction optical system 122 in the direction perpendicular to the optical axis to follow the output of the saturation prevention control unit 107. The output of the A/D converter 118 is supplied not only to the subtracter 108 but also to the rolling shutter distortion correction amount calculation unit 200 and a geometrical deformation amount calculation unit 203.

The image pickup device 123 converts the object image formed by the imaging optical system 120 into an electrical signal that is a captured image signal, and supplies it to a signal processing unit 124. The signal processing unit 124 generates a video signal complying with, for example, the NTSC format from the signal obtained by the image pickup device 123 and supplies it to an image memory 125 and a motion vector detection unit 126.

The motion vector detection unit 126 detects motion vectors at a plurality of points in the image based on a luminance signal included in the current video signal generated by the signal processing unit 124 and a luminance signal included in a video signal stored in the image memory 125 of the immediately preceding field. Each motion vector is acquired including components with magnitudes in the x-axis direction and the y-axis direction. The motion vector data detected by the motion vector detection unit 126 is supplied to the geometrical deformation amount calculation unit 203 that calculates a geometrical deformation amount used to correct the deformation between captured images.

A rolling shutter distortion correction unit 141 corrects, in accordance with the calculation result of the rolling shutter distortion correction amount calculation unit 200, the rolling shutter distortion that has occurred in the captured image stored in the image memory 125. Details of the rolling shutter distortion correction amount calculation unit 200 and the rolling shutter distortion correction unit 141 will be described later.

For the image that has undergone the rolling shutter distortion correction by the rolling shutter distortion correction unit 141, a geometrical deformation unit 142 further performs geometrical deformation to correct the blur of the captured image caused by the shake that has occurred in the image capturing apparatus 100.

The geometrical deformation unit 142 operates in accordance with the calculation result of the geometrical deformation amount calculation unit 203 and deforms the image using, for example, affine transformation. A method of causing the geometrical deformation amount calculation unit 203 to calculate the parameter of affine transformation from motion vectors is disclosed in, for example, Japanese Patent Laid-Open No. 2005-269419. In affine transformation, a blur can be corrected by performing geometrical deformation such as enlargement/reduction, rotation, and horizontal/vertical displacement of an image.

The geometrical deformation unit 142 may be configured to deform an image using projective transformation as well as affine transformation. A method of causing the geometrical deformation amount calculation unit 203 to calculate the parameter of projective transformation from motion vectors is disclosed in, for example, Japanese Patent Laid-Open No. 2008-217526. In projective transformation, geometrical deformation of tilt can be performed in addition to enlargement/reduction, rotation, and horizontal/vertical displacement of an image. Note that tilt is a deformation that distorts a planar object into a trapezoid when a shake in the yaw or pitch direction has occurred in the image capturing apparatus.

The video signal that has undergone blur correction by the geometrical deformation unit 142 is supplied to a recording control unit 128 and a display control unit 130. The display control unit 130 outputs the video signal supplied from the geometrical deformation unit 142 and causes a display device 131 to display the image. The display control unit 130 drives the display device 131. The display device 131 displays the image by an LCD (Liquid Crystal Display) or the like. When an operation unit (not shown) used to instruct the start or end of recording has instructed to record the video signal, the recording control unit 128 outputs the video signal supplied from the geometrical deformation unit 142 to a recording medium 129 and records the video signal. The recording medium 129 is an information recording medium such as a semiconductor memory or a magnetic recording medium such as a hard disk.

Note that in the above description, the rolling shutter distortion correction unit 141 and the geometrical deformation unit 142 sequentially perform image deformation. However, the blocks may sequentially calculate only the image read address from the image memory 125, and the image deformation processes may finally be performed at once.

The operations of the rolling shutter distortion correction unit 141 and the rolling shutter distortion correction amount calculation unit 200 according to this embodiment will be described next in detail.

Figure 2:
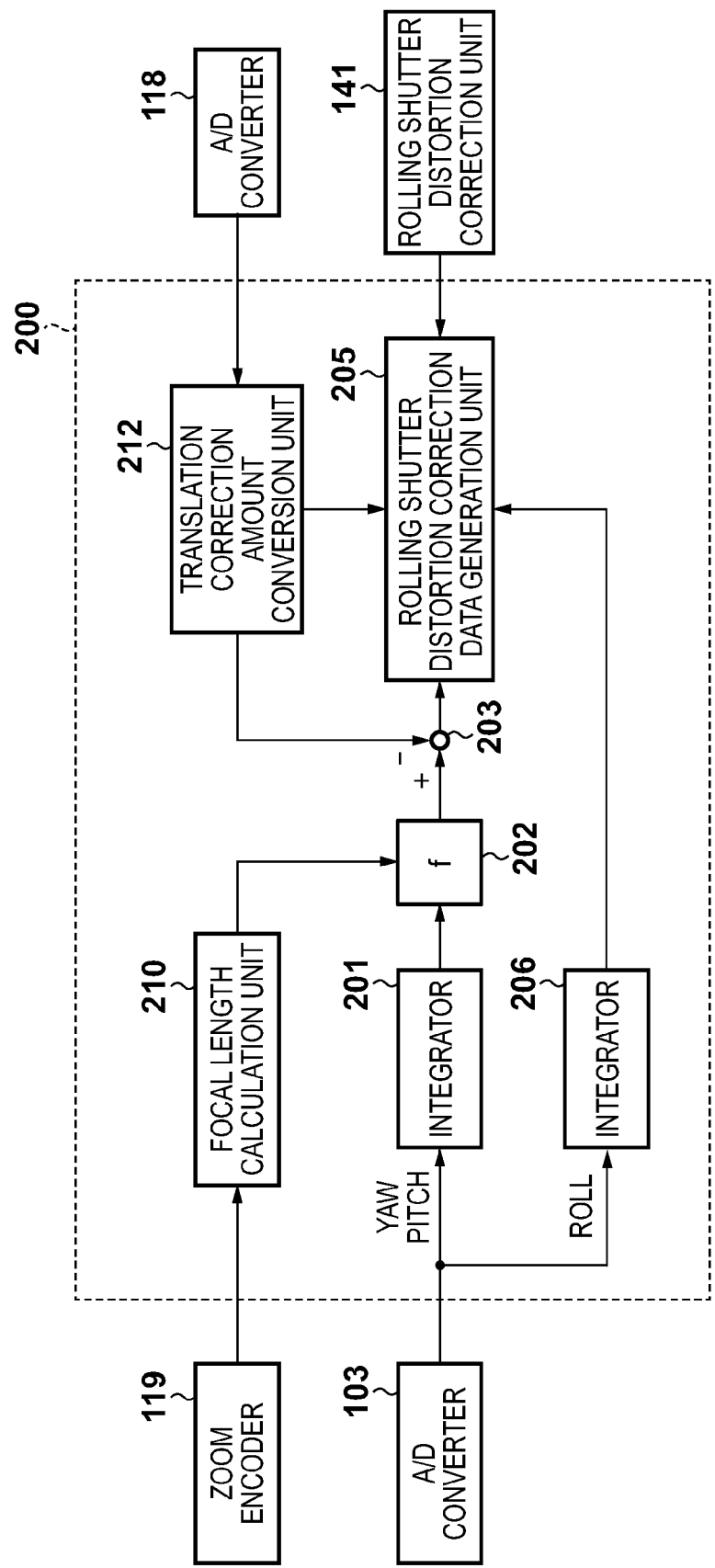
FIG. 2 is a block diagram showing an example of the arrangement of a rolling shutter distortion correction amount calculation unit 200.

FIG. 2 is a block diagram showing the arrangement of the rolling shutter distortion correction amount calculation unit 200. Referring to FIG. 2, out of the output from the A/D converter 103, angular velocity data in the yaw or pitch direction is supplied to an integrator 201. The integrator 201 integrates the angular velocity data in the yaw or pitch direction and generates angle data in synchronism with the charge accumulation timing of the image pickup device 123.

A focal length calculation unit 210 calculates the focal length of the imaging optical system 120 from the output of the above-described zoom encoder 119 and sets a focal length used for calculation of a focal length multiplication unit 202. The focal length multiplication unit 202 multiplies the output of the integrator 201 by a focal length f calculated by the focal length calculation unit 210, thereby calculating the moving amount of the object image on the imaging plane caused by the shake in the yaw or pitch direction.

A translation correction amount conversion unit 212 calculates, using the output of the A/D converter 118, the translation correction amount on imaging plane corrected by the correction optical system 122. The object image whose blur has been corrected by the correction optical system 122 is formed on the image pickup device 123. Hence, a subtracter 203 subtracts the translation correction amount corrected by the correction optical system 122 from the output of the focal length multiplication unit 202, and supplies the resultant data to a rolling shutter distortion correction data generation unit 205.

Out of the output from the A/D converter 103, angular velocity data of the imaging optical system 120 about the optical axis (to be referred to as a roll direction hereinafter) is supplied to an integrator 206. The integrator 206 integrates the angular velocity data in the roll direction, generates angle data in accordance with the charge accumulation timing of the image pickup device 123, and supplies it to the rolling shutter distortion correction data generation unit 205.

The calculation of the rolling shutter distortion correction data generation unit 205 will be described below separately concerning a case in which the correction optical system 122 optically corrects an image blur that has occurred in the image capturing apparatus and a case in which the correction optical system 122 does not optically correct the image blur. The case in which correction by the correction optical system 122 is not performed will be described first.

Figure 3A:
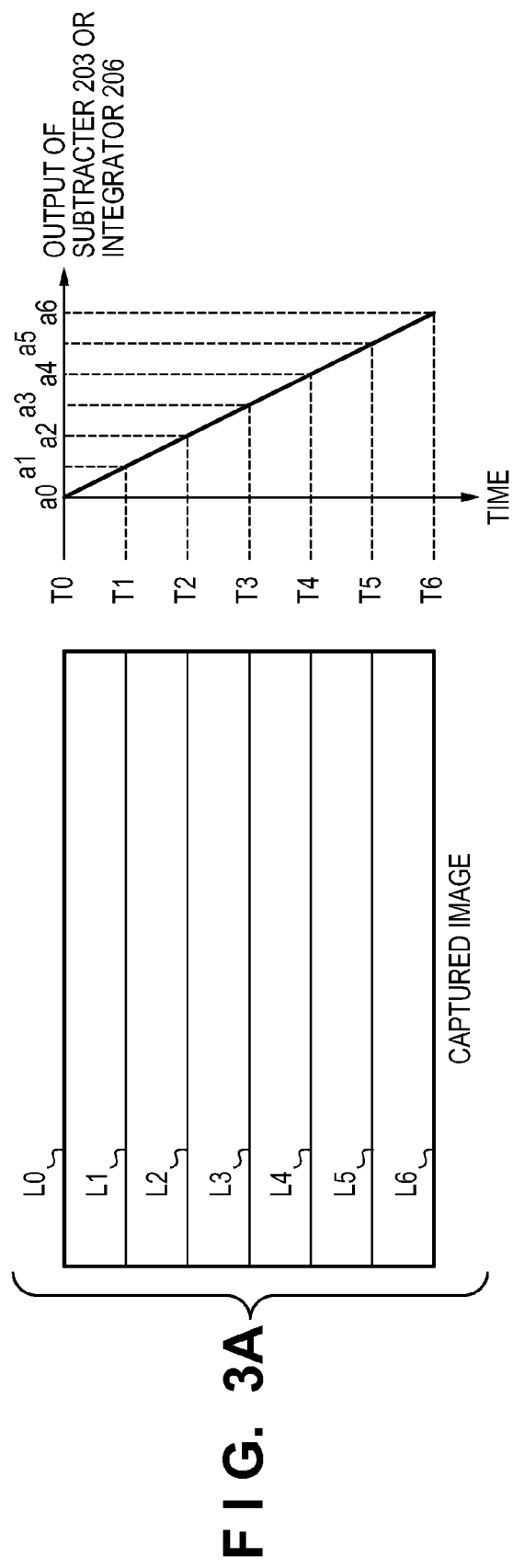
FIGS. 3A and 3B are views for explaining the operation of the rolling shutter distortion correction amount calculation unit 200 when an image blur is not optically corrected.
Figure 3B:
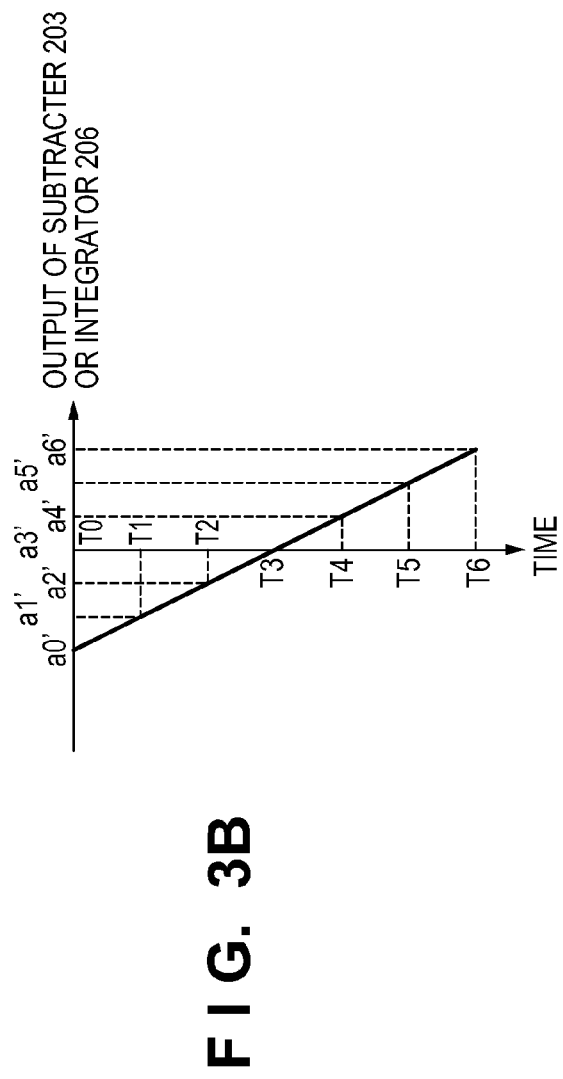

FIGS. 3A and 3B are views for explaining the operation of the rolling shutter distortion correction amount calculation unit 200. Referring to FIG. 3A, the rectangular pattern on the left side indicates a captured image. The graph on the right side has an ordinate representing time and an abscissa representing the output of the subtracter 203 or the output of the integrator 206 in FIG. 2, and shows a time-rate change in the blur amount or blur angle on the imaging plane when a shake has occurred in the image capturing apparatus. The charge accumulation timings of image lines L0 to L6 of the captured image shown in FIG. 3A correspond to times T0 to T6, respectively. The integrators 201 and 206 start integrating angular velocity data from the time T0. Hence, the output of the subtracter 203 or the output of the integrator 206 changes its magnitude gradually from 0 at the time T0 up to the time T6, as shown in FIG. 3A.

The rolling shutter distortion correction data generation unit 205 acquires data a0 to a6 output from the subtracter 203 or the integrator 206 at the times T0 to T6 and stores them in the internal memory (not shown) of the μCOM 101. In this description, the rolling shutter distortion correction data generation unit 205 acquires the seven data a0 to a6. However, the number of data to be acquired is not limited to this. Any number of data can be acquired when a method of acquiring a plurality of data in synchronism with the accumulation timing of each image line of the captured image is used.

The rolling shutter distortion correction data generation unit 205 also calculates data (rolling shutter distortion correction setting data) to be set in the rolling shutter distortion correction unit 141 using the data a0 to a6 acquired from the output of the subtracter 203 or the output of the integrator 206. More specifically, the rolling shutter distortion correction data generation unit 205 performs calculation of subtracting, from each of the acquired data a0 to a6, a3 that is the output of the subtracter 203 or the output of the integrator 206 at the charge accumulation timing T3 of the line L3 that passes though the center of the captured image. FIG. 3B is a graph for explaining this calculation. The ordinate and the abscissa of FIG. 3B are the same as those described for FIG. 3A. Let a0' to a6' be the results obtained by subtracting a3 from a0 to a6. The calculation result indicates that a0 to a6 shift such that a3'=0, as shown in FIG. 3B. This indicates the relative position change amounts of the lines based on a predetermined line of the image. The rolling shutter distortion correction data generation unit 205 sets the data a0' to a6' in the rolling shutter distortion correction unit 141 as rolling shutter distortion correction setting data.

Figure 4A:
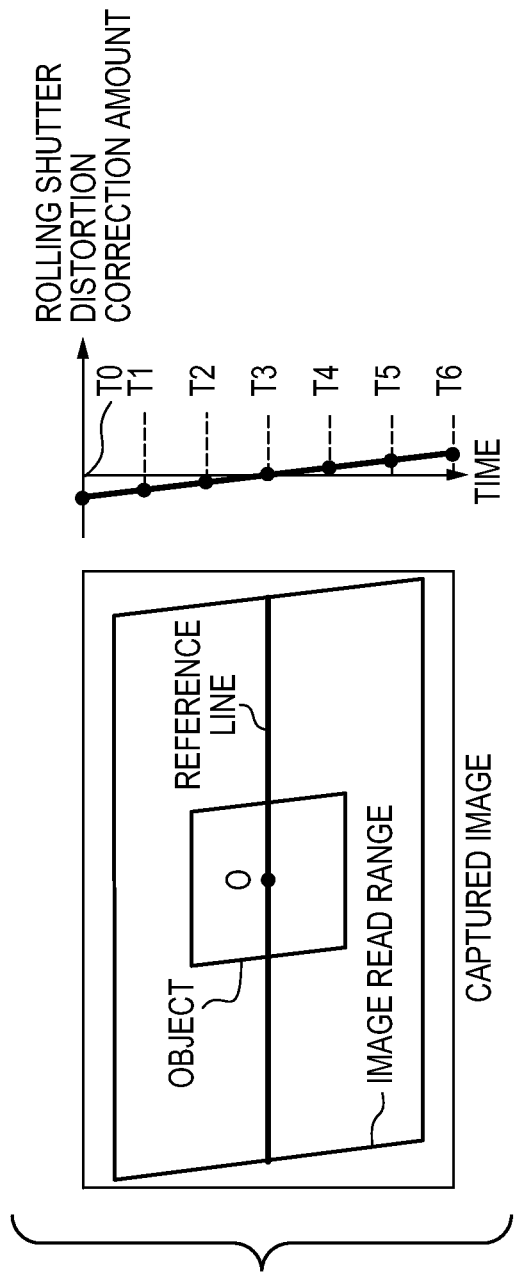
FIGS. 4A to 4D are views for explaining the operation of a rolling shutter distortion correction unit 141 when an image blur is not optically corrected.
Figure 4B:
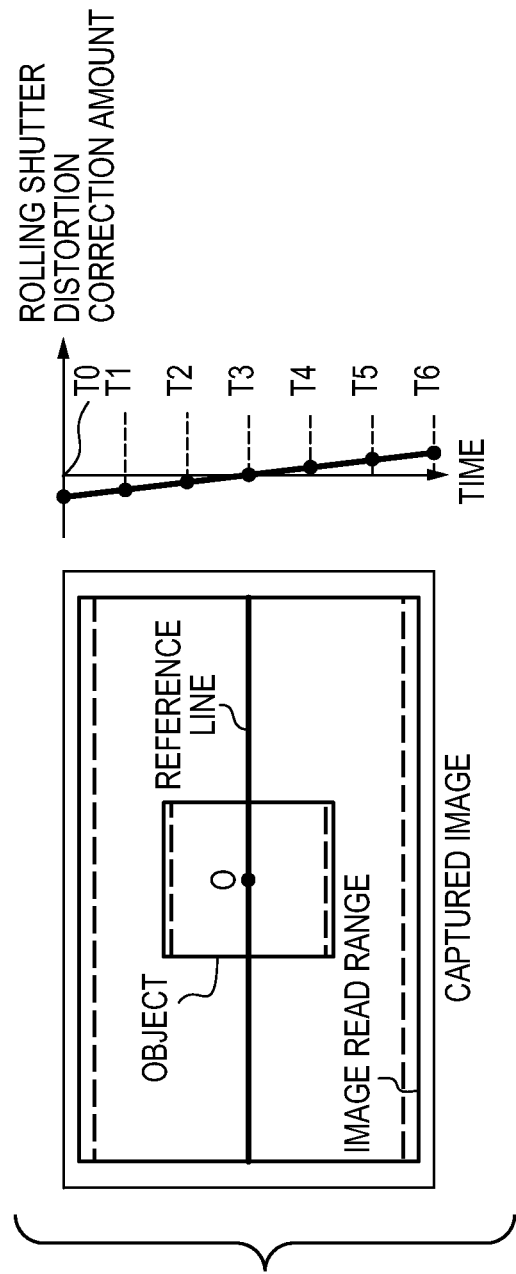
Figure 4C:
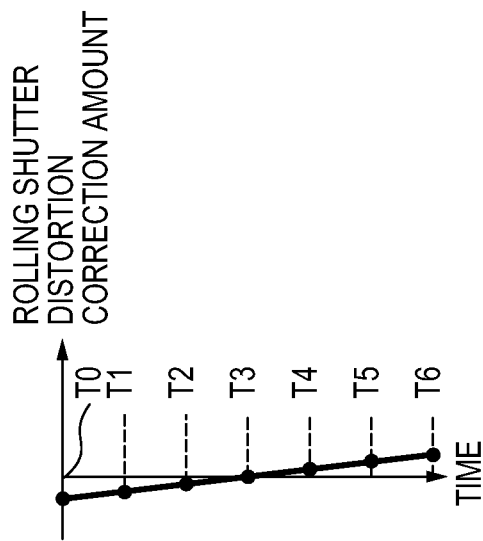
Figure 4C:
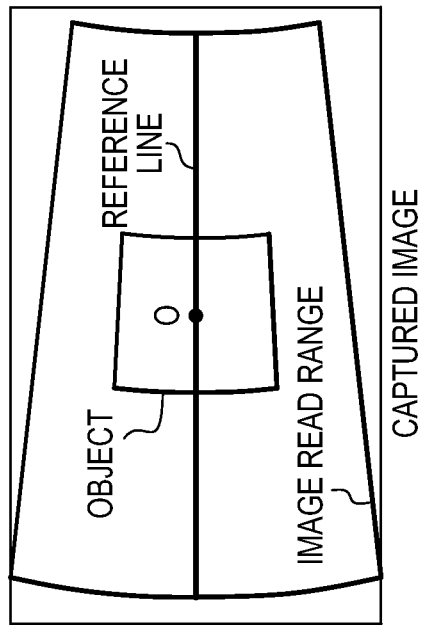
Figure 4D:
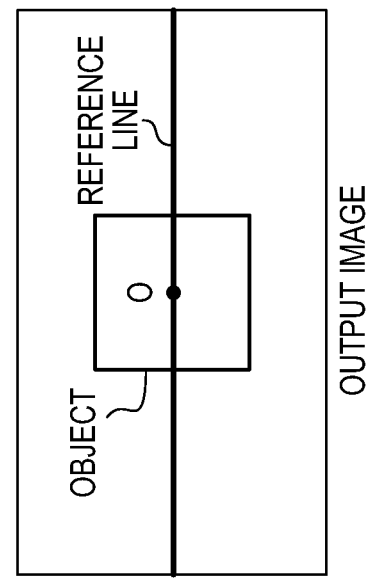

FIGS. 4A to 4D are views for explaining a method of causing the rolling shutter distortion correction unit 141 to perform rolling shutter distortion correction based on the rolling shutter distortion correction setting data calculated by the rolling shutter distortion correction data generation unit 205. FIG. 4A shows rolling shutter distortion correction (first distortion correction) in the horizontal direction (lateral direction) of the image. FIG. 4B shows rolling shutter distortion correction (second distortion correction) in the vertical direction of the image. FIG. 4C shows rolling shutter distortion correction (third distortion correction) in the rotational direction of the image. FIG. 4D shows an output image after a rolling shutter distortion is corrected in FIG. 4A, 4B, or 4C.

The range of the outermost rectangle of the pattern shown on the left side of FIG. 4A indicates the range of the entire captured image of the image capturing apparatus. The small rhombic pattern in the captured image indicates a state in which a rolling shutter distortion occurs due to application of a shake in the yaw direction to the image capturing apparatus, and the object originally having a square shape is captured in an obliquely distorted state. The graph on the right side of FIG. 4A has an ordinate representing time and an abscissa representing the correction amount of the rolling shutter distortion (to be referred to as a rolling shutter distortion correction amount hereinafter), and plots the rolling shutter distortion correction setting data at the times T0 to T6.

The rolling shutter distortion correction unit 141 calculates rolling shutter distortion correction amounts at the charge accumulation timings corresponding to all image lines of the captured image from the rolling shutter distortion correction setting data that are discrete data at the times T0 to T6 using a known method such as linear interpolation, polynomial approximation, or the least squares method. The rolling shutter distortion correction unit 141 changes the horizontal image read start position for each image line in accordance with the rolling shutter distortion correction amounts, thereby correcting the rolling shutter distortion. That is, the image read range is changed as indicated by the large rhombic pattern shown in FIG. 4A, thereby correcting the rolling shutter distortion.

At this time, the rolling shutter distortion correction amount at the time T3 is set to zero, as described with reference to FIG. 3B. For this reason, the horizontal image read start position of the image line including a center position O of the captured image is not changed when the rolling shutter distortion correction is not performed. That is, as shown in FIG. 4A, the image line including the center position O of the captured image serves as the reference line of rolling shutter distortion correction. FIG. 4D shows the output image after the rolling shutter distortion is corrected. The object distorted to a rhombus in FIG. 4A is corrected to the original shape. In addition, since the horizontal image read start position of the reference line is not changed, the center position O of the captured image on the output image does not change.

The range of the outermost rectangle of the pattern shown on the left side of FIG. 4B indicates the range of the entire captured image of the image capturing apparatus. The small rectangular pattern long in the vertical direction in the captured image indicates a state in which a rolling shutter distortion occurs due to application of a shake in the pitch direction to the image capturing apparatus, and the object (the dotted line portion in FIG. 4B) originally having a square shape is captured while being distorted to be long in the vertical direction. The graph on the right side of FIG. 4B has an ordinate representing time and an abscissa representing the rolling shutter distortion correction amount, and plots the rolling shutter distortion correction setting data at the times T0 to T6.

As described above, the rolling shutter distortion correction unit 141 calculates rolling shutter distortion correction amounts at the charge accumulation timings corresponding to all image lines of the captured image from the rolling shutter distortion correction setting data that are discrete data at the times T0 to T6. The rolling shutter distortion correction unit 141 shifts the image read line in the vertical direction in accordance with the rolling shutter distortion correction amounts, thereby correcting the rolling shutter distortion. That is, the image read range is changed as indicated by the rectangular pattern immediately inside the captured image range shown in FIG. 4B, thereby correcting the rolling shutter distortion (the dotted line portion in FIG. 4B indicates the image read range when rolling shutter distortion correction is not performed).

At this time, the rolling shutter distortion correction amount at the time T3 is set to zero, as in FIG. 4A. For this reason, the vertical image read position of the image line including the center position O of the captured image is the same as that when the rolling shutter distortion correction is not performed. That is, as shown in FIG. 4B, the image line including the center position O of the captured image serves as the reference line of rolling shutter distortion correction. FIG. 4D shows the output image after the rolling shutter distortion is corrected. The object distorted to a rectangle in FIG. 4B is corrected to the original shape. In addition, since the vertical image read position of the reference line is not changed, the center position O of the captured image on the output image does not change.

The range of the outermost rectangle of the pattern shown on the left side of FIG. 4C indicates the range of the entire captured image of the image capturing apparatus. The small sector pattern in the captured image indicates a state in which a rolling shutter distortion occurs due to application of a shake in the roll direction to the image capturing apparatus, and the object originally having a square shape is captured while being distorted in a sector shape. The graph on the right side of FIG. 4C has an ordinate representing time and an abscissa representing the rolling shutter distortion correction amount, and plots the rolling shutter distortion correction setting data at the times T0 to T6.

As described above, the rolling shutter distortion correction unit 141 calculates rolling shutter distortion correction amounts at the charge accumulation timings corresponding to all image lines of the captured image from the rolling shutter distortion correction setting data that are discrete data at the times T0 to T6. The rolling shutter distortion correction unit 141 changes the image read position by rotating each image read line using the image center O as the origin in accordance with the rolling shutter distortion correction amounts, thereby correcting the rolling shutter distortion. That is, the image read range is changed as indicated by the large sector pattern shown in FIG. 4C, thereby correcting the rolling shutter distortion.

At this time, the rolling shutter distortion correction amount at the time T3 is set to zero, as in FIGS. 4A and 4B. For this reason, the horizontal/vertical image read position of the image line including the center position O of the captured image is the same as that when the rolling shutter distortion correction is not performed. That is, as shown in FIG. 4C, the image line including the center position O of the captured image serves as the reference line of rolling shutter distortion correction. FIG. 4D shows the output image after the rolling shutter distortion is corrected. The object distorted to a sector shape in FIG. 4C is corrected to the original shape. In addition, since the horizontal/vertical image read position of the reference line is not changed, the center position O of the captured image on the output image does not change.

When the reference lines for rolling shutter distortion correction in the vertical, horizontal, and rotational directions are set as described above, the image center position O on the image does not move between the images before and after rolling shutter distortion correction. The pixel position (the point O in FIGS. 4A to 4C) that does not move between the images before and after rolling shutter distortion correction and serves as the origin of rolling shutter distortion correction is defined as the correction reference position (reference coordinates) of rolling shutter distortion correction.

The reason why the reference line and the correction reference position are set will be described below. After the rolling shutter distortion correction unit 141 has corrected a rolling shutter distortion in the captured image, the geometrical deformation unit 142 corrects the blur of the captured image by geometrical deformation. When using projective transformation as the geometrical deformation method of the geometrical deformation unit 142, the geometrical deformation unit 142 performs correction of tilt/rotation/translation.

Figure 5A:
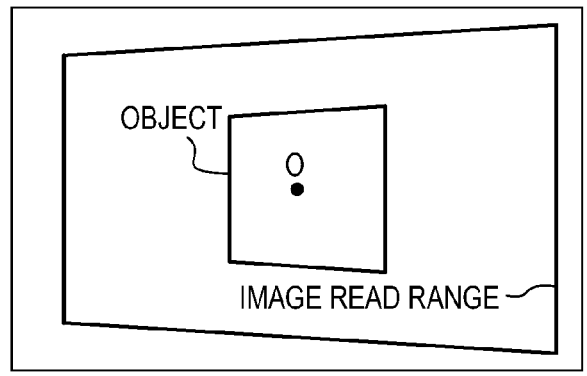
FIGS. 5A to 5D are views for explaining the operation of a geometrical deformation unit 142 when an image blur is not optically corrected.

FIG. 5A is a view for explaining tilt correction by the geometrical deformation unit 142. The range of the outermost rectangle shown in FIG. 5A indicates the image that has undergone rolling shutter distortion correction by the rolling shutter distortion correction unit 141. The small trapezoidal pattern in the image indicates a state in which the object originally having a square shape is captured while being distorted to a trapezoid due to application of a shake in the yaw direction to the image capturing apparatus. The geometrical deformation unit 142 changes the image read range as indicated by the large trapezoidal pattern shown in FIG. 5A by projective transformation, thereby correcting the tilt.

Figure 5B:
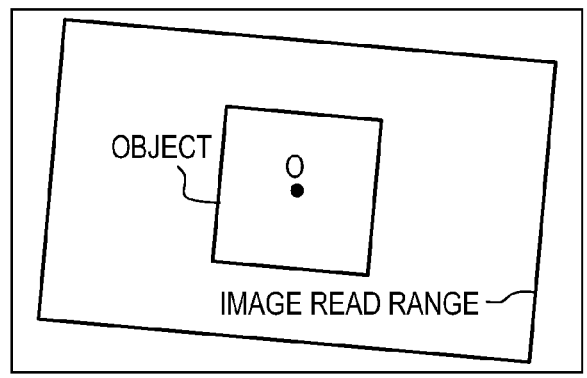
Figure 5C:
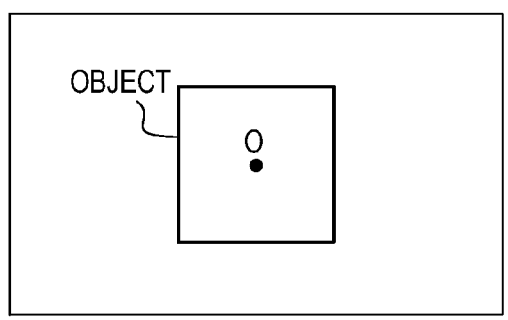

FIG. 5C shows the output image after tilt correction or rotation correction to be described later. The object distorted to a trapezoid in FIG. 5A is corrected to the original shape. In addition, tilt correction is performed using the center position O of the image after the rolling shutter distortion correction shown in FIG. 5A as the reference. The center position O matches the correction reference position (reference coordinates) of the rolling shutter distortion correction. Hence, even when the geometrical deformation unit 142 further performs tilt correction after the rolling shutter distortion correction, the correction reference position on the output image does not move.

FIG. 5B is a view for explaining rotation correction by the geometrical deformation unit 142. The range of the outermost rectangle shown in FIG. 5B indicates the image that has undergone rolling shutter distortion correction by the rolling shutter distortion correction unit 141. The square pattern tilted to right in the image indicates a state in which the object that is originally untilted is captured in a tilted state due to application of a shake in the roll direction (about the optical axis) to the image capturing apparatus. The geometrical deformation unit 142 changes the image read range as indicated by the tilted rectangular pattern shown in FIG. 5B by projective transformation, thereby correcting the rotation.

FIG. 5C shows the output image after rotation or tilt correction, as described above. The object tilted to right in FIG. 5B is corrected to the original shape. In addition, rotation correction is performed using the center position O of the image after the rolling shutter distortion correction shown in FIG. 5B as the reference. The center position O matches the correction reference position of the rolling shutter distortion correction. Hence, even when the geometrical deformation unit 142 further performs rotation correction after the rolling shutter distortion correction, the correction reference position on the output image does not move.

Figure 5D:
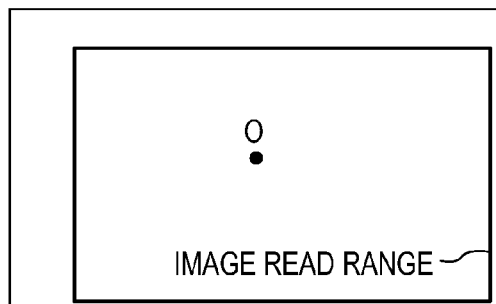

FIG. 5D is a view for explaining translation correction by the geometrical deformation unit 142. The range of the outermost rectangle shown in FIG. 5D indicates the output image that has undergone tilt and rotation correction by the geometrical deformation unit 142. The geometrical deformation unit 142 changes the image read range as indicated by the small rectangular pattern shown in FIG. 5D, thereby correcting the translation.

The correction reference position on the output image does not change up to the rolling shutter distortion correction and tilt/rotation correction, as described above. Hence, correct blur correction can be done by correcting the translation amount by the blur from the charge accumulation timing of the pixel at the correction reference position on the captured image of the immediately preceding field to the charge accumulation timing of the pixel at the correction reference position on the captured image of the current field.

As described above, when correction by the correction optical system 122 is not performed, both the correction reference position on the reference line of rolling shutter distortion correction and the reference position (the pixel position whose coordinates do not change before and after geometrical deformation except translation) of geometrical deformation are set as the center position of the captured image. This can solve the conventional problem of the object position shift and new blur occurrence caused by inappropriately setting the reference line in rolling shutter distortion correction.

Note that in the above description, the position O of the captured image set as the correction reference position need not always be the center position of the captured image. The correction reference position need only be set near the position (almost center) on the captured image perpendicular to the optical axis of the imaging optical system 120. The above description has been made assuming that the position on the captured image perpendicular to the optical axis almost matches the center position of the captured image for the sake of simplicity.

In the above description, translation correction by the geometrical deformation unit 142 is done for the image after tilt/rotation correction, for the descriptive convenience. In actuality, instead of separately performing the respective image deformation processes, the tilt/rotation/translation deformation processes are simultaneously performed using projective transformation.

Calculation of the rolling shutter distortion correction data generation unit 205 when performing image blur correction by the correction optical system 122 will be described next.

Figure 6:
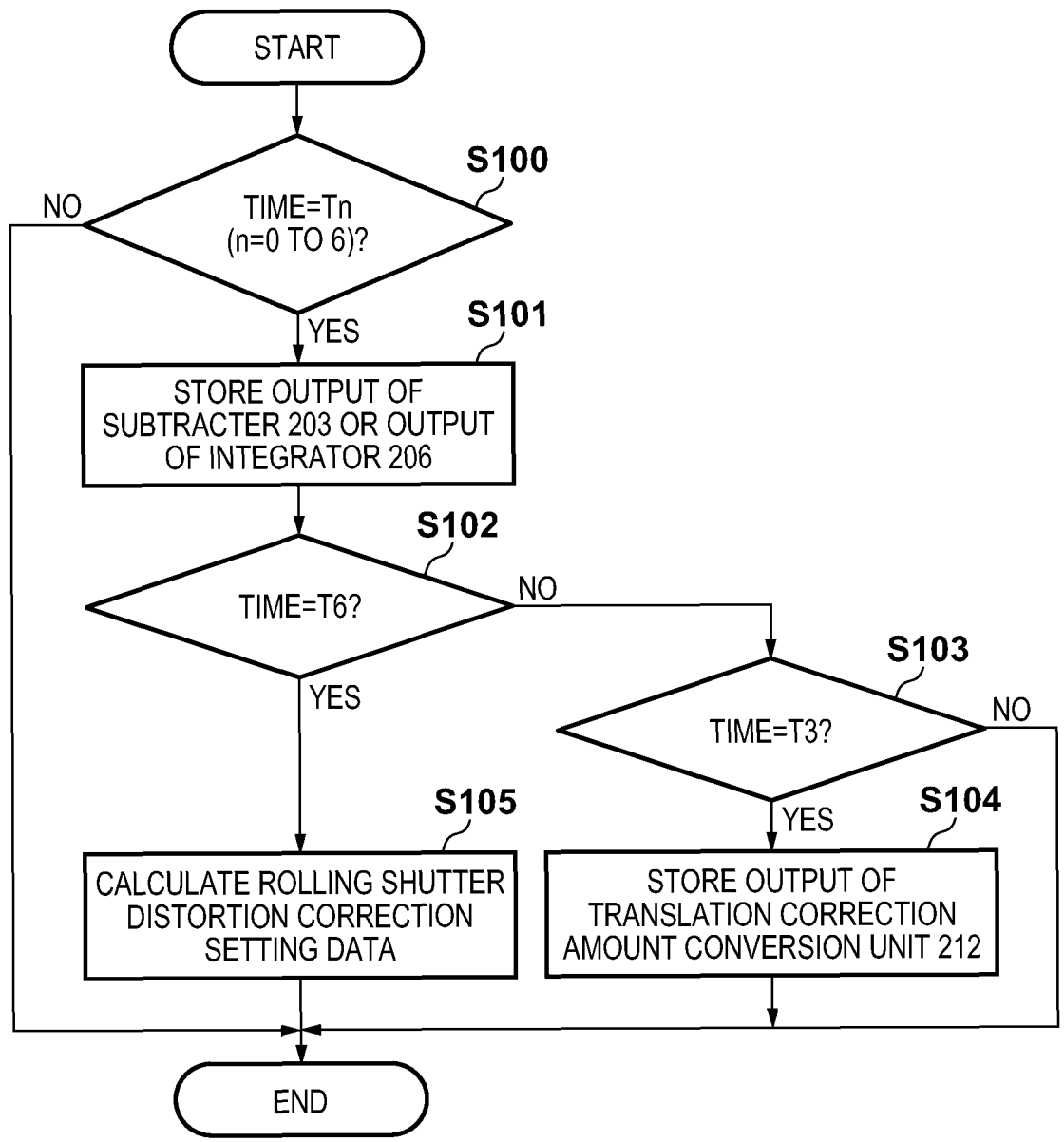
FIG. 6 is a flowchart of processing performed by a rolling shutter distortion correction data generation unit 205 when optically correcting an image blur.
Figure 7A:
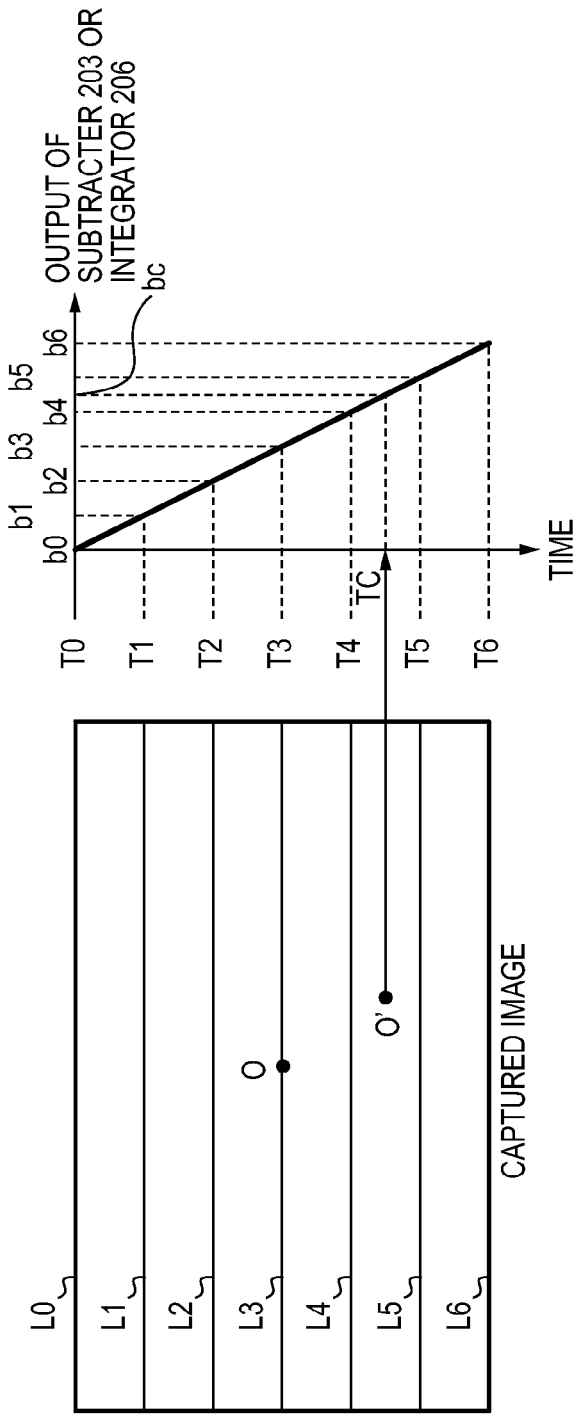
FIGS. 7A and 7B are views for explaining the operation of the rolling shutter distortion correction amount calculation unit 200 when optically correcting an image blur.
Figure 7B:
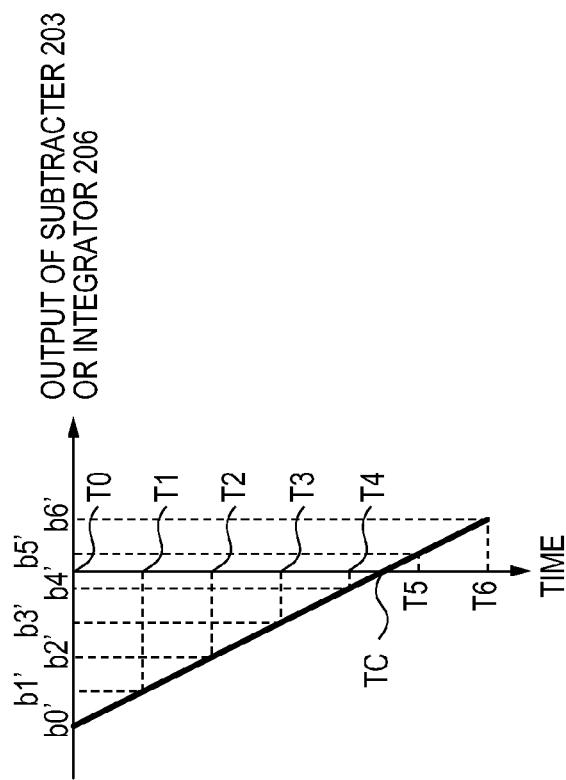

Calculation of rolling shutter distortion correction setting data of the rolling shutter distortion correction data generation unit 205 will be described with reference to FIGS. 6, 7A, and 7B. FIG. 6 is a flowchart of calculation processing performed of the rolling shutter distortion correction data generation unit 205. The processing of the flowchart of FIG. 6 is executed repetitively at a period of, for example, 10 kHz.

In step S100, the rolling shutter distortion correction data generation unit 205 determines whether the time from the start of accumulation of the captured image matches one of the times T0 to T6. The times T0 to T6 are the charge accumulation timings of the image lines L0 to L6 of the captured image shown on the left side of FIG. 7A. If NO in step S100, the processing ends. If YES in step S100, the process advances to step S101.

In step S101, the rolling shutter distortion correction data generation unit 205 acquires the output of the subtracter 203 or the output of the integrator 206 at the times T0 to T6 and stores it in the internal memory of the μCOM 101. More specifically, the rolling shutter distortion correction data generation unit 205 acquires b0 to b6 which are the outputs of the subtracter 203 or the outputs of the integrator 206 at the times T0 to T6 in the graph shown on the right side of FIG. 7A and having the same axes as in FIG. 3A. Each of the data b0 to b6 represents a time-rate change in the blur amount or blur angle on the imaging plane when a shake has occurred in the image capturing apparatus, like the above-described data a0 to a6. In this embodiment, the rolling shutter distortion correction data generation unit 205 acquires the seven data b0 to b6. However, the number of data to be acquired is not limited to this. Any number of data can be acquired when a method of acquiring a plurality of data in synchronism with the accumulation timing of each image line of the captured image is used. After step S101, the process advances to step S102.

In step S102, it is determined whether the current time is T6, that is, the current time matches the charge accumulation timing of the last image line of the captured image. If NO in step S102, the process advances to step S103. In step S103, it is determined whether the current time is T3, that is, the current time matches the charge accumulation timing of the image line at the center of the captured image. If NO in step S103, the processing ends. If YES in step S103, the process advances to step S104.

In step S104, the output of the translation correction amount conversion unit 212 is stored in the internal memory of the μCOM 101. The output of the translation correction amount conversion unit 212 represents the relative moving amount of the object position on the imaging plane between a state in which the correction optical system 122 is located at the initial position (a state in which the optical axis is not deflected) and a state in which the correction optical system 122 has changed its position. After the process of step S104, the processing ends.

If YES in step S102, that is, if the current time matches the charge accumulation timing of the last image line of the captured image, the process advances to step S105. In step S105, the rolling shutter distortion correction data generation unit 205 calculates rolling shutter distortion correction setting data using the data b0 to b6 acquired in step S101 and the output data of the translation correction amount conversion unit 212 acquired in step S104. More specifically, first, a position O' (to be referred to as a moved center position hereinafter) to which the center position O of the captured image has moved in accordance with the change in the position of the correction optical system 122 is calculated from the output data of the translation correction amount conversion unit 212. Next, as shown in FIG. 7A, a time TC at which the charges of the image line including the moved center position O' are accumulated is calculated.

The method of calculating the time TC will be described below. First, assume that the moved center position O' on the captured image is located between the image lines L4 and L5, as shown in FIG. 7A. Letting M be the number of image lines existing between L4 and L5, and N be the number of image lines existing between L4 and the image line including the moved center position O', TC is given by $$TC=T4+N/M\times(T5-T4) \quad (1)$$

After calculation of the time TC, an output bc of the subtracter 203 or the integrator 206 at the time TC is estimated from the data b0 to b6 acquired in step S101. For example, linear interpolation is usable as the estimation method. In the example shown in FIG. 7A, bc can be calculated using liner interpolation as $$bc=b4+(TC-T4)/(T5-T4)\times(b5-b4) \quad (2)$$

Note that the linear interpolation calculation of equation (2) is merely an example, and various methods such as polynomial approximation or the least squares method can be used.

After calculation of bc, the rolling shutter distortion correction data generation unit 205 performs calculation of subtracting bc from b0 to b6. FIG. 7B is a graph for explaining this calculation. The ordinate and abscissa of FIG. 7B are the same as those described with reference to FIG. 3B. Let b0' to b6' be the results obtained by subtracting bc from b0 to b6. The calculation result indicates that b0 to b6 shift such that the value on the abscissa is 0 at the time TC, as shown in FIG. 7B. The data b0' to b6' are the data set in the rolling shutter distortion correction unit 141 as rolling shutter distortion correction setting data. After the process of step S105, the processing of FIG. 6 ends.

Figure 8A:
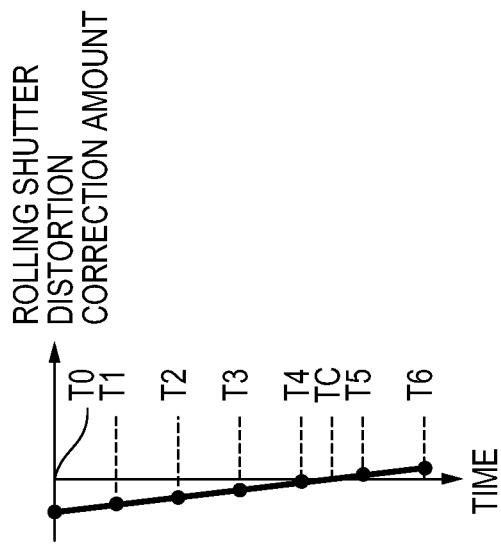
FIGS. 8A to 8D are views for explaining the operation of the rolling shutter distortion correction unit 141 when optically correcting an image blur.
Figure 8A:
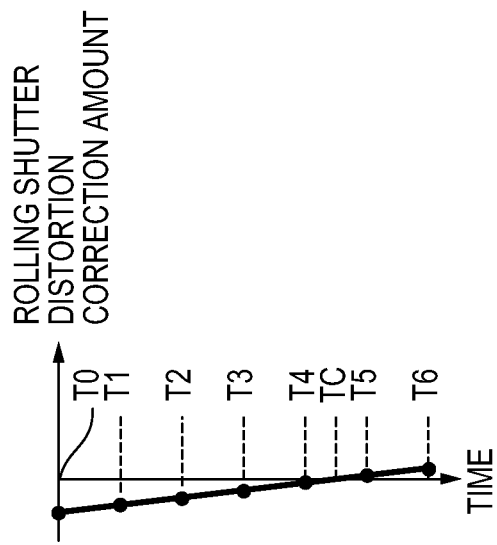
Figure 8B:
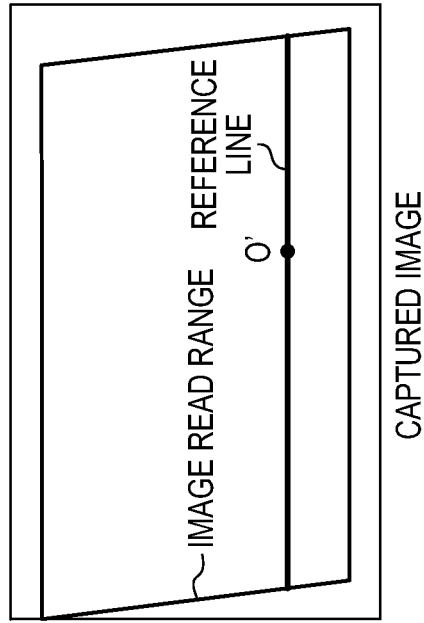
Figure 8B:
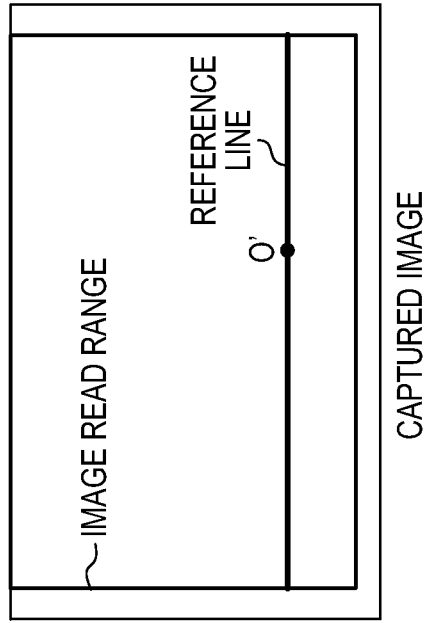
Figure 8C:
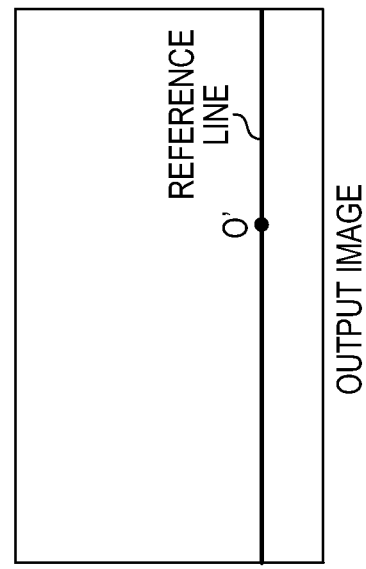
Figure 8C:
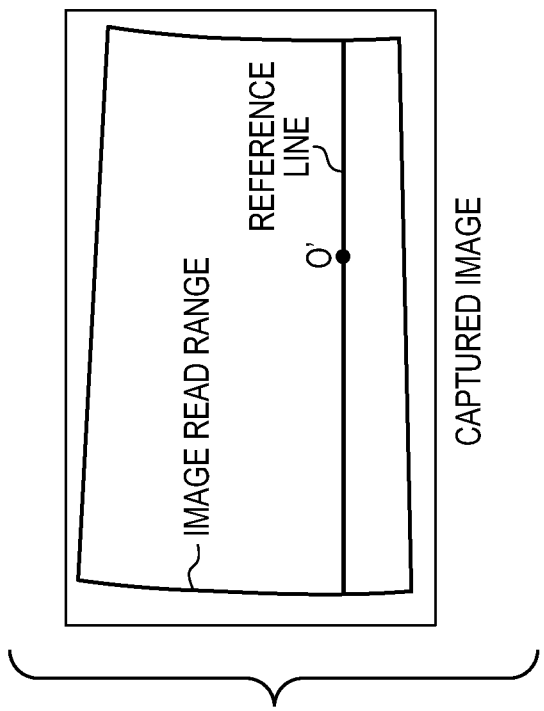
Figure 8D:
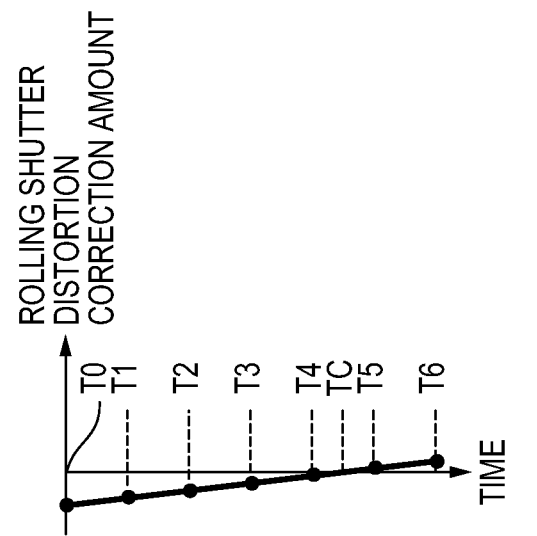

FIGS. 8A to 8D show graphs for explaining a method of causing the rolling shutter distortion correction unit 141 to perform rolling shutter distortion correction based on the rolling shutter distortion correction setting data calculated by the rolling shutter distortion correction data generation unit 205. FIG. 8A shows rolling shutter distortion correction in the horizontal direction of the image, FIG. 8B shows rolling shutter distortion correction in the vertical direction of the image, and FIG. 8C shows rolling shutter distortion correction in the rotational direction of the image. FIG. 8D shows an output image after the rolling shutter distortion correction in FIGS. 8A, 8B, and 8C.

The range of the outermost rectangle of the pattern shown on the left side of FIG. 8A indicates the range of the entire captured image of the image capturing apparatus. The graph on the right side of FIG. 8A has an ordinate representing time and an abscissa representing the rolling shutter distortion correction amount, and plots the rolling shutter distortion correction setting data at the times T0 to T6.

The rolling shutter distortion correction unit 141 calculates rolling shutter distortion correction amounts at the charge accumulation timings corresponding to all image lines of the captured image from the rolling shutter distortion correction setting data that are discrete data at the times T0 to T6, as described above. The rolling shutter distortion correction unit 141 changes the horizontal image read start position for each image line in accordance with the rolling shutter distortion correction amounts, thereby correcting the rolling shutter distortion. That is, the image read range is changed as indicated by the rhombic pattern shown in FIG. 8A, thereby correcting the rolling shutter distortion.

At this time, the rolling shutter distortion correction amount at the time TC is set to zero, as described with reference to FIG. 7B. For this reason, the horizontal image read start position of the image line including the moved center position O' of the captured image is the same as that when the rolling shutter distortion correction is not performed. That is, as shown in FIG. 8A, the image line including the moved center position O' of the captured image serves as the reference line of rolling shutter distortion correction. FIG. 8D shows the output image after the rolling shutter distortion is corrected. Since the horizontal image read start position of the reference line is not changed, the moved center position O' of the captured image on the output image does not change.

The range of the outermost rectangle of the pattern shown on the left side of FIG. 8B indicates the range of the entire captured image of the image capturing apparatus. The graph on the right side of FIG. 8B has an ordinate representing time and an abscissa representing the rolling shutter distortion correction amount, and plots the rolling shutter distortion correction setting data at the times T0 to T6.

The rolling shutter distortion correction unit 141 calculates rolling shutter distortion correction amounts at the charge accumulation timings corresponding to all image lines of the captured image from the rolling shutter distortion correction setting data that are discrete data at the times T0 to T6, as described above. The rolling shutter distortion correction unit 141 shifts the image read line in the vertical direction in accordance with the rolling shutter distortion correction amounts, thereby correcting the rolling shutter distortion. That is, the image read range is changed as indicated by the rectangular pattern immediately inside the captured image range shown in FIG. 8B, thereby correcting the rolling shutter distortion.

At this time, the rolling shutter distortion correction amount at the time TC is set to zero, as in FIG. 8A. For this reason, the vertical image read position of the image line including the moved center position O' of the captured image is the same as that when the rolling shutter distortion correction is not performed. That is, as shown in FIG. 8B, the image line including the moved center position O' of the captured image serves as the reference line of rolling shutter distortion correction. FIG. 8D shows the output image after the rolling shutter distortion is corrected. Since the vertical image read position of the reference line is not changed, the moved center position O' of the captured image on the output image does not change.

The range of the outermost rectangle of the pattern shown on the left side of FIG. 8C indicates the range of the entire captured image of the image capturing apparatus. The graph on the right side of FIG. 8C has an ordinate representing time and an abscissa representing the rolling shutter distortion correction amount, and plots the rolling shutter distortion correction setting data at the times T0 to T6.

The rolling shutter distortion correction unit 141 calculates rolling shutter distortion correction amounts at the charge accumulation timings corresponding to all image lines of the captured image from the rolling shutter distortion correction setting data that are discrete data at the times T0 to T6, as described above. The rolling shutter distortion correction unit 141 changes the image read position by rotating each image read line using the moved center position O' as the origin in accordance with the rolling shutter distortion correction amounts, thereby correcting the rolling shutter distortion. That is, the image read range is changed as indicated by the sector pattern shown in FIG. 8C, thereby correcting the rolling shutter distortion.

At this time, the rolling shutter distortion correction amount at the time TC is set to zero, as in FIGS. 8A and 8B. For this reason, the horizontal/vertical image read position of the image line including the moved center position O' of the captured image is the same as that when the rolling shutter distortion correction is not performed. That is, as shown in FIG. 8C, the image line including the moved center position O' of the captured image serves as the reference line of rolling shutter distortion correction. FIG. 8D shows the output image after the rolling shutter distortion is corrected. Since the horizontal/vertical image read position of the reference line is not changed, the moved center position O' of the captured image on the output image does not change.

When the image line including the moved center position O' of the captured image is set as the reference line, as described above, the movement of the moved center position O' of the captured image does not occur between the images before and after the vertical/horizontal/rotational rolling shutter distortion correction. When the correction optical system 122 corrects the image blur, the moved center position O' is set as the correction reference position.

The reason why the reference line is set, and the moved center position O' is set as the correction reference position will be described below. After the rolling shutter distortion correction unit 141 has corrected a rolling shutter distortion in the captured image, the geometrical deformation unit 142 corrects the blur of the captured image by geometrical deformation. When using projective transformation as the geometrical deformation method of the geometrical deformation unit 142, the geometrical deformation unit 142 performs correction of tilt/rotation.

Figure 9A:
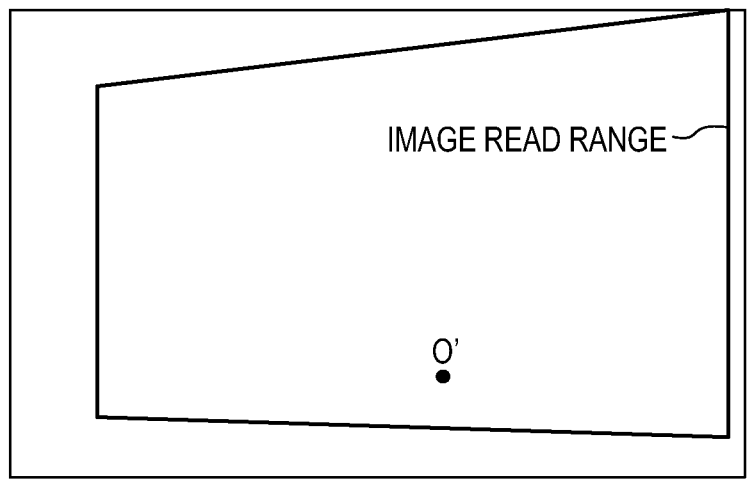
FIGS. 9A to 9C are views for explaining the operation of the geometrical deformation unit 142 when optically correcting an image blur.

FIG. 9A is a view for explaining tilt correction by the geometrical deformation unit 142 when the object is captured while being distorted to a trapezoid due to application of a shake in the yaw direction to the image capturing apparatus. When the correction optical system 122 corrects an image blur, the image of the object is formed on the image pickup device 123 in a state in which the blur in the translational direction that should occur on the captured image is corrected in advance. Tilt correction needs to be performed for the image before the blur in the translational direction is corrected. If the correction optical system 122 has not performed translation correction, the object captured at the moved center position O' is located at the center position of the captured image shown in FIG. 7A. Hence, tilt correction needs to be done using the moved center position O' as the reference. The moved center position O' is calculated by the geometrical deformation amount calculation unit 203 based on the output of the A/D converter 118 and set in the geometrical deformation unit 142.

The range of the outermost rectangle shown in FIG. 9A indicates the image that has undergone rolling shutter distortion correction by the rolling shutter distortion correction unit 141. The geometrical deformation unit 142 changes the image read range to a trapezoidal shape using the moved center position O' as the reference as indicated by the trapezoidal pattern shown in FIG. 9A by projective transformation, thereby correcting the tilt.

Figure 9B:
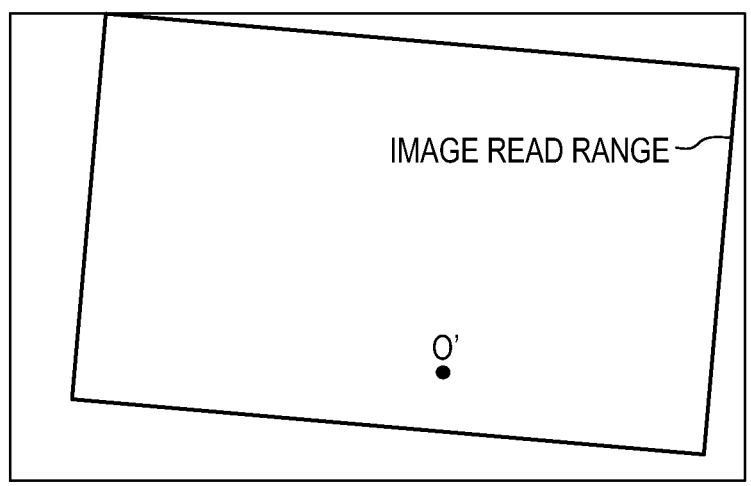
Figure 9C:
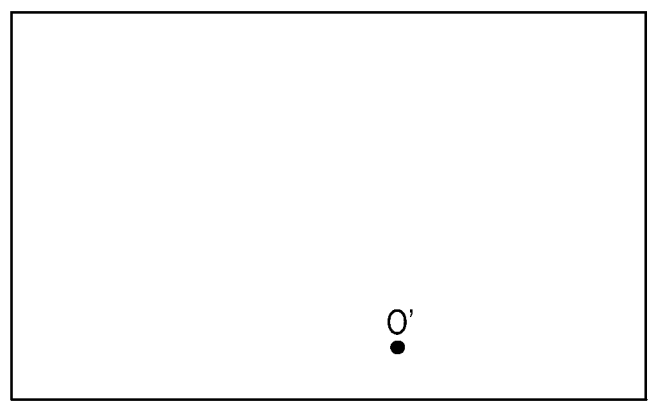

FIG. 9C shows the output image after tilt correction or rotation correction to be described later. Tilt correction is performed using the moved center position O' of the image after the rolling shutter distortion correction shown in FIG. 9A as the reference. The moved center position O' matches the correction reference position of the rolling shutter distortion correction. Hence, even when the geometrical deformation unit 142 further performs tilt correction after the rolling shutter distortion correction, the correction reference position on the output image does not move.

FIG. 9B is a view for explaining rotation correction by the geometrical deformation unit 142 when the object is captured in a tilted state due to application of a shake in the roll direction (about the optical axis) to the image capturing apparatus. A rotation also needs to be corrected using the moved center position O' as the reference, like the tilt.

The range of the outermost rectangle shown in FIG. 9B indicates the image that has undergone rolling shutter distortion correction by the rolling shutter distortion correction unit 141. The geometrical deformation unit 142 tilts the image read range using the moved center position O' as the reference as indicated by the tilted rectangular pattern shown in FIG. 9B by projective transformation, thereby correcting the rotation.

FIG. 9C shows the output image after rotation or tilt correction, as described above. Rotation correction is performed using the moved center position O' of the image after the rolling shutter distortion correction shown in FIG. 9B as the reference. The moved center position O' matches the correction reference position of the rolling shutter distortion correction. Hence, even when the geometrical deformation unit 142 further performs rotation correction after the rolling shutter distortion correction, the correction reference position on the output image does not move.

As described above, when the correction optical system 122 corrects the image blur, both the correction reference position on the reference line of rolling shutter distortion correction and the reference position (the pixel position whose coordinates do not change before and after geometrical deformation except translation) of geometrical deformation are set as the moved center position O'. That is, the center position of the captured image when the correction optical system 122 does not deflect the optical axis is set as the position to which the position has moved in accordance with a change in the position of the correction optical system 122. This can solve the conventional problem of the object position shift and new blur occurrence caused by inappropriately setting the reference line in rolling shutter distortion correction.

Note that in the above description, the position O of the captured image need not always be the center position of the captured image, and need only be set near the position on the captured image perpendicular to the optical axis of the imaging optical system 120. The above description has been made assuming that the position on the captured image perpendicular to the optical axis matches the center position of the captured image for the sake of simplicity.

In this embodiment, the correction optical system 122 that is a shift lens has been exemplified as the optical image stabilization means. However, the present invention is not limited to this. Various kinds of image stabilization means are usable, including a method of driving the image pickup device 123 and a method using a prism (VAP).

(Second Embodiment)

Figure 10:
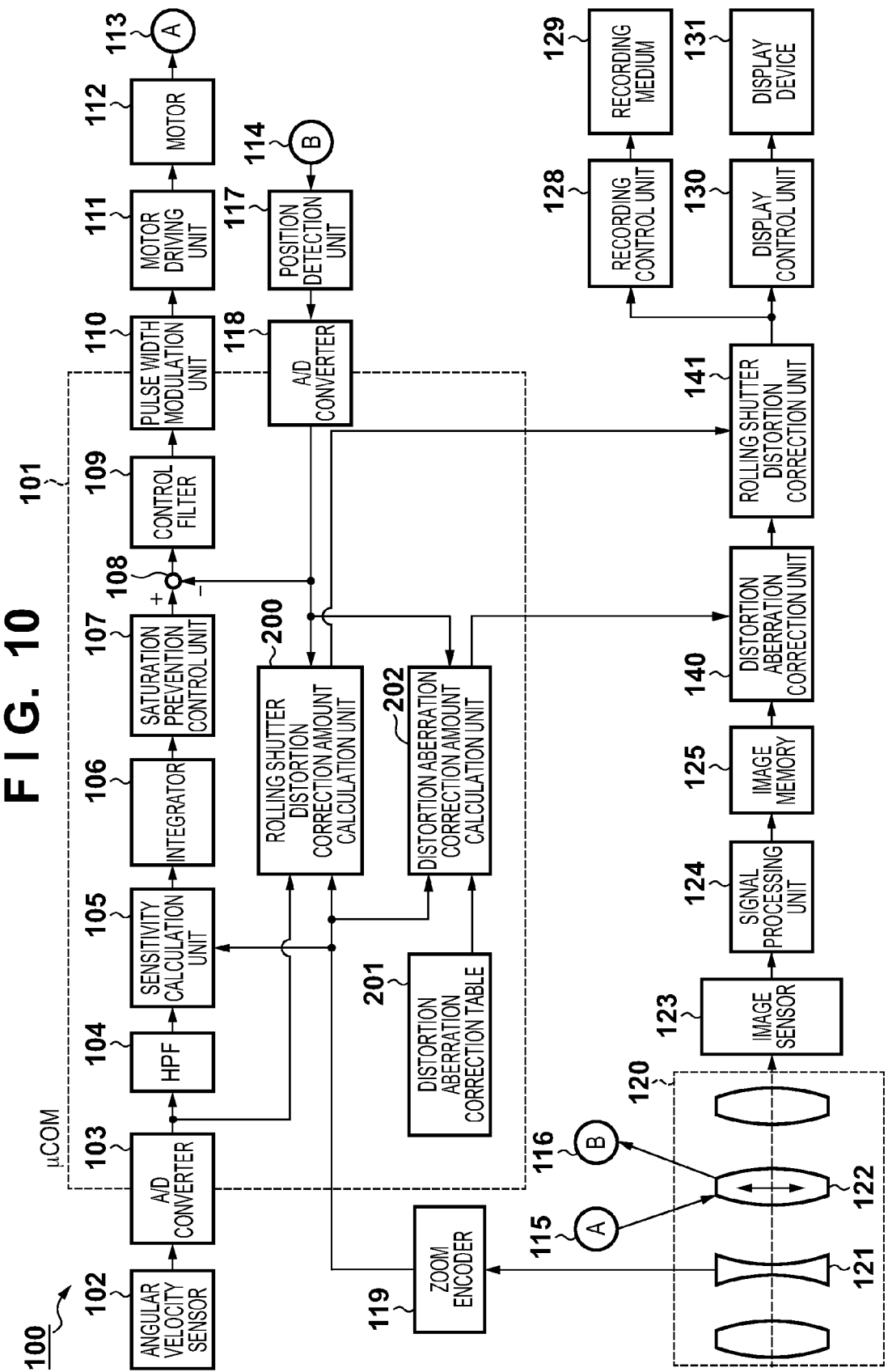
FIG. 10 is a block diagram showing an example of the arrangement of an image capturing apparatus according to the second embodiment.

FIG. 10 is a block diagram showing of the arrangement of a video camera that is an example of an image capturing apparatus according to the second embodiment of the present invention. Note that the same reference numerals as in FIG. 1 denote the same parts in FIG. 10, and a description thereof will be omitted. In FIG. 10, the motion vector detection unit 126, the geometrical deformation amount calculation unit 203, and the geometrical deformation unit 142 are removed from the arrangement shown in FIG. 1, and a distortion aberration correction table 201, a distortion aberration correction amount calculation unit 202, and a distortion aberration correction unit 140 are added.

In this embodiment, the distortion aberration correction unit 140 corrects a distortion aberration of an imaging optical system 120 before a rolling shutter distortion correction unit 141 performs rolling shutter distortion correction. As the distortion aberration correction method of the distortion aberration correction unit 140, various methods have been proposed, and any method is usable. For example, Japanese Patent Laid-Open No. 2008-259076 discloses a method of expressing the characteristic of a distortion aberration radially distorted from the center of an image by an nth-order polynomial of the distance from the image center. A description will be made below assuming that the distortion aberration correction is performed using the nth-order polynomial.

The distortion aberration correction table 201 holds coefficients of the nth-order polynomial for each zoom position, which are stored in a nonvolatile memory (not shown) such as a flash memory. The distortion aberration correction amount calculation unit 202 refers to the coefficients of the nth-order polynomial used to correct the distortion aberration of the imaging optical system 120 based on the output of a zoom encoder 119 and supplies them to the distortion aberration correction unit 140.

The distortion aberration correction unit 140 corrects the distortion aberration of a captured image stored in an image memory 125 based on the coefficients set by the distortion aberration correction amount calculation unit 202. The rolling shutter distortion correction unit 141 performs rolling shutter distortion correction for the image that has undergone the distortion aberration correction by the distortion aberration correction unit 140. Note that in the above description, the distortion aberration correction unit 140 and the rolling shutter distortion correction unit 141 sequentially perform image deformation. However, the blocks may sequentially calculate only the image read address from the image memory 125, and the image deformation processes may finally be performed at once.

Figure 11A:
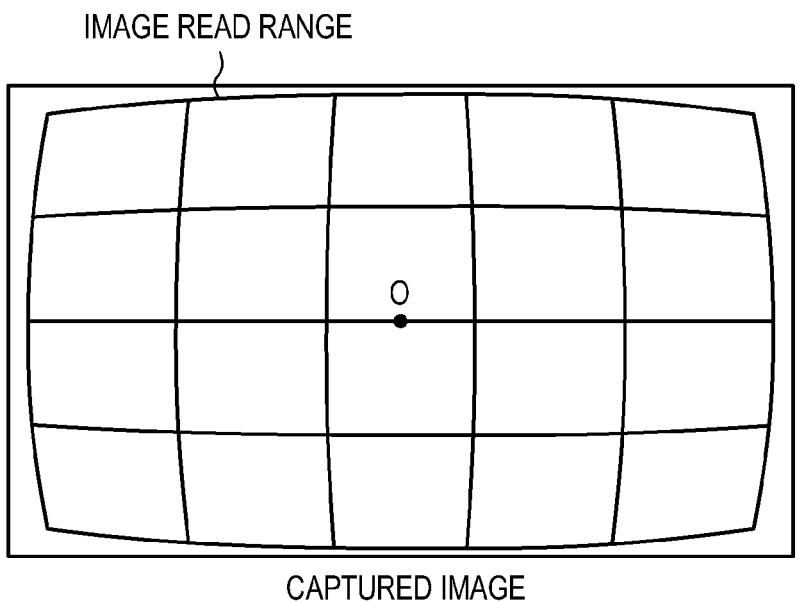
FIGS. 11A and 11B are views for explaining the operation of a distortion aberration correction unit 140 when an image blur is not optically corrected.
Figure 11B:
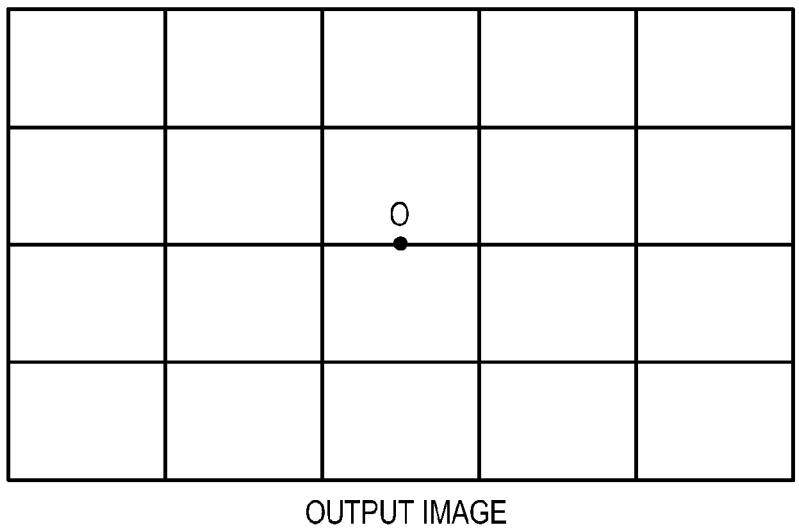

FIGS. 11A and 11B are views for explaining distortion aberration correction by the distortion aberration correction unit 140 when a correction optical system 122 does not correct an image blur. The range of the outermost rectangle shown in FIG. 11A indicates the range of the entire captured image of the image capturing apparatus. The distorted grating-shaped pattern in the captured image indicates an object that originally has a grating shape as shown in FIG. 11B and is captured in a distorted state due to the distortion aberration of the imaging optical system 120. The distortion aberration correction unit 140 radially changes the read position of the captured image using a center position O of the captured image as the reference position, thereby correcting the distortion aberration.

FIG. 11B shows the output image after the distortion aberration is corrected. The distorted grating-shaped object in FIG. 11A is corrected to the original shape. As described above, since distortion aberration correction is performed using the center position O of the captured image as the reference, the center position O on the output image does not change after the distortion aberration correction, as shown in FIG. 11B.

The operation of the rolling shutter distortion correction unit 141 is the same as that described in the first embodiment except that the rolling shutter distortion correction is performed not for the captured image but for the image after distortion aberration correction. The rolling shutter distortion correction unit 141 performs rolling shutter distortion correction using the image line passing through the center of the image as the reference line, as described with reference to FIGS. 4A to 4D. That is, rolling shutter distortion correction is performed using the center position O of the output image in FIG. 11B as the correction reference position and the image line passing through the center position O as the reference line. With this processing, the center position O of the captured image in FIG. 11A does not move even after distortion aberration correction and rolling shutter distortion correction.

As described above, when correction by the correction optical system 122 is not performed, both the reference position of distortion aberration correction (the pixel position whose coordinates do not move before and after distortion aberration correction) and the correction reference position of rolling shutter distortion correction are set as the center position O of the captured image. This can solve the conventional problem of the object position shift and new blur occurrence caused by inappropriately setting the reference line in rolling shutter distortion correction when correction by the correction optical system 122 is not performed.

Figure 12A:
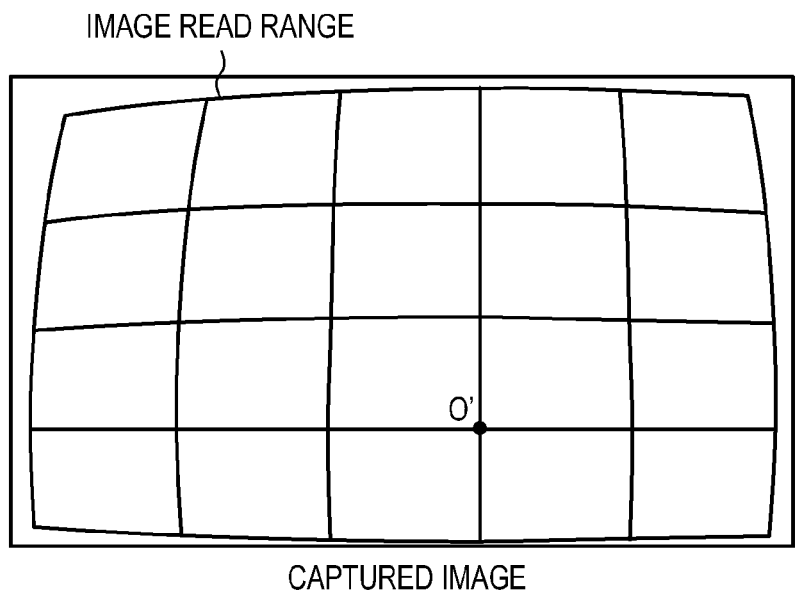
FIGS. 12A and 12B are views for explaining the operation of the distortion aberration correction unit 140 when optically correcting an image blur.
Figure 12B:
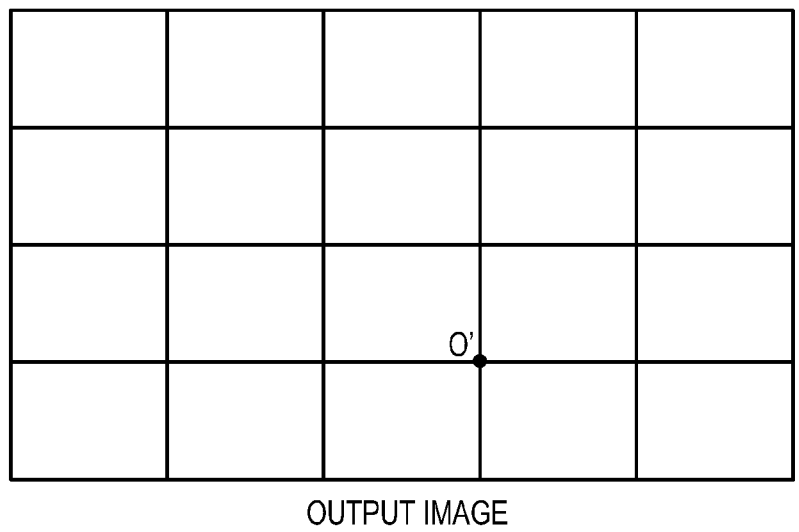

FIGS. 12A and 12B are views for explaining distortion aberration correction by the distortion aberration correction unit 140 when the correction optical system 122 corrects an image blur. The range of the outermost rectangle shown in FIG. 12A indicates the range of the entire captured image of the image capturing apparatus. A position O' on the captured image shown in FIG. 12A is the moved center position to which the center position O of the captured image has moved in accordance with the change in the position of the correction optical system 122, as described with reference to FIGS. 7A and 7B. When the position of the correction optical system 122 changes, the center position of the distortion aberration on the captured image also changes and almost matches the moved center position O'. Hence, the distorted grating-shaped pattern in the captured image shown in FIG. 12A indicates an object that originally has a grating shape as shown in FIG. 12B and is captured while being distorted radially from the moved center position O' due to the distortion aberration of the imaging optical system 120.

When the correction optical system 122 corrects the image blur, the distortion aberration correction amount calculation unit 202 calculates the moved center position O' using the output of an A/D converter 118 as well as the coefficients of the nth-order polynomial and sets the position in the distortion aberration correction unit 140. The distortion aberration correction unit 140 radially changes the read position of the captured image using the moved center position O' set by the distortion aberration correction amount calculation unit 202 as the reference position, thereby correcting the distortion aberration.

FIG. 12B shows the output image after the distortion aberration is corrected. The distorted grating-shaped object in FIG. 12A is corrected to the original shape. Since distortion aberration correction is performed using the moved center position O' of the captured image as the reference, the moved center position O' on the output image does not change after the distortion aberration correction, as shown in FIG. 12B.

The rolling shutter distortion correction unit 141 performs rolling shutter distortion correction using the image line passing through the moved center position O' as the reference line, as described with reference to FIGS. 8A to 8D. That is, rolling shutter distortion correction is performed using the moved center position O' of the output image in FIG. 12B as the correction reference position and the image line passing through the moved center position O' as the reference line. With this processing, the moved center position O' of the captured image in FIG. 12A does not move even after distortion aberration correction and rolling shutter distortion correction.

As described above, when correction by the correction optical system 122 is performed, both the reference position of distortion aberration correction (the pixel position whose coordinates do not move before and after distortion aberration correction) and the correction reference position of rolling shutter distortion correction are set as the moved center position O'. That is, the center position of the captured image when the correction optical system 122 does not deflect the optical axis is set as the position to which the position has moved in accordance with a change in the position of the correction optical system 122. This can solve the conventional problem of the object position shift and new blur occurrence caused by inappropriately setting the reference line in rolling shutter distortion correction when correction by the correction optical system 122 is performed.

Note that in the above description, the position O of the captured image need not always be the center position of the captured image, and need only be set near the position on the captured image perpendicular to the optical axis of the imaging optical system 120. The above description has been made assuming that the position on the captured image perpendicular to the optical axis almost matches the center position of the captured image for the sake of simplicity.

In this embodiment, the correction optical system 122 has been exemplified as the optical image stabilization means. However, the present invention is not limited to this. Various kinds of image stabilization means are usable, including a method of driving an image pickup device 123 and a method using a prism (VAP).

(Third Embodiment)

Figure 13:
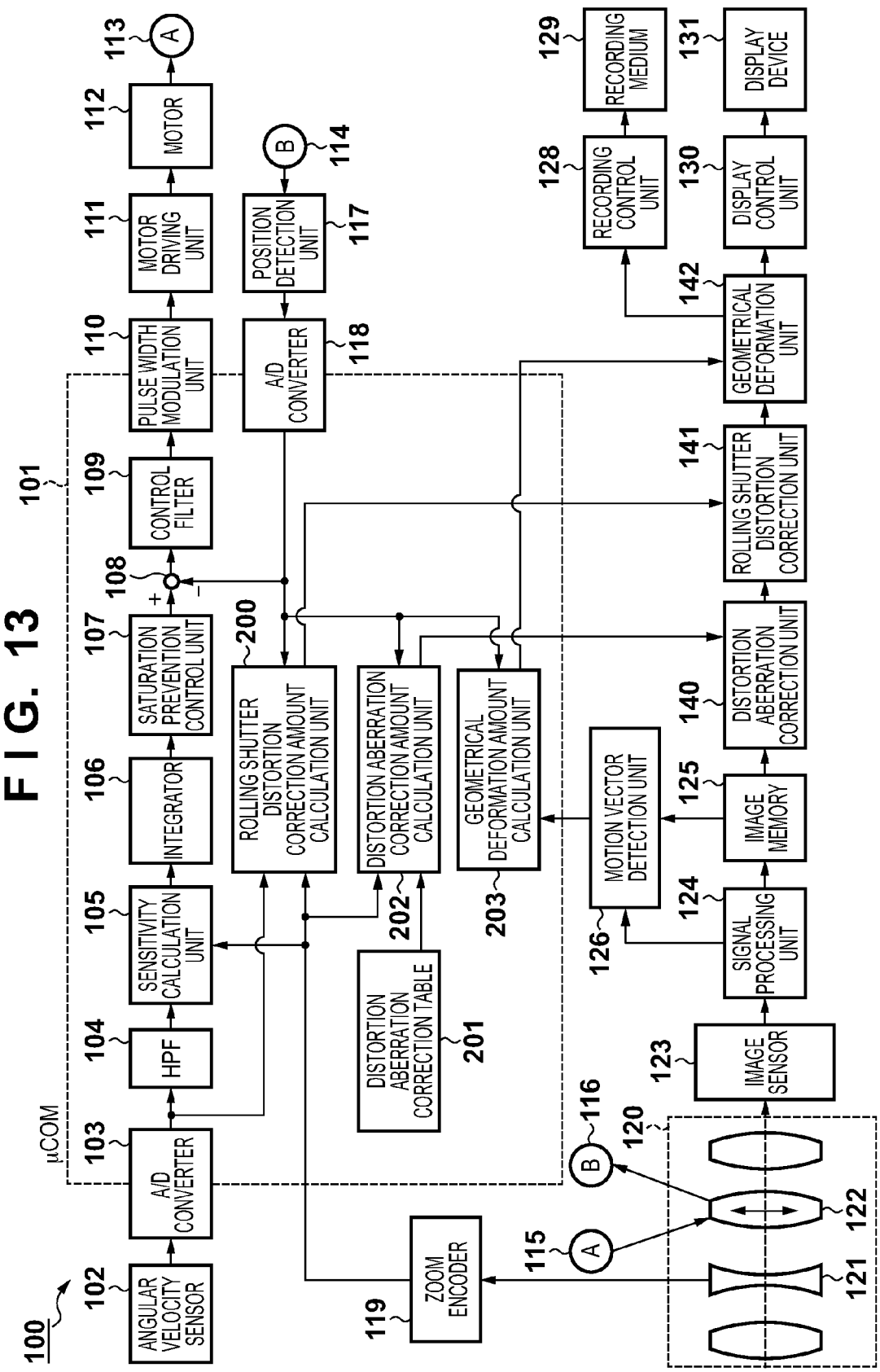
FIG. 13 is a block diagram showing an example of the arrangement of an image capturing apparatus according to the third embodiment.
Figure 14A:
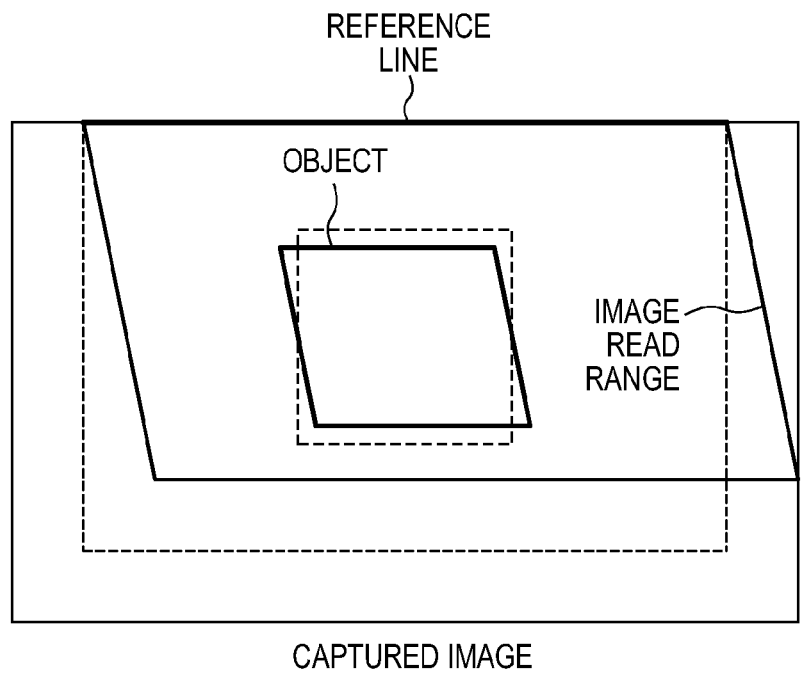
FIGS. 14A and 14B are views for explaining a conventional problem of rolling shutter distortion correction.
Figure 14B:
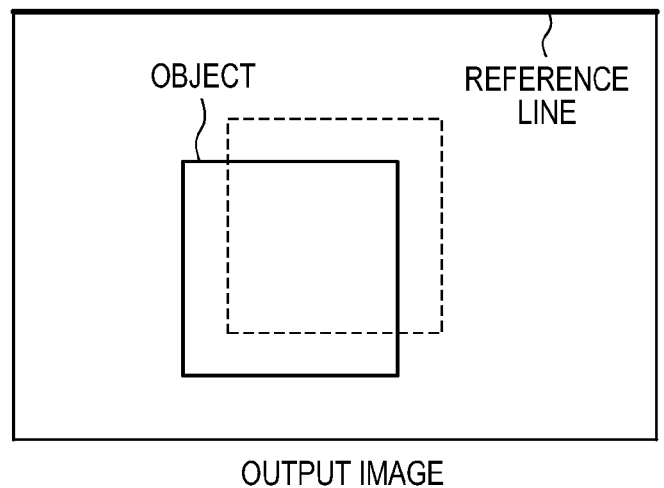

FIG. 13 is a block diagram showing of the arrangement of a video camera that is an example of an image capturing apparatus according to the third embodiment of the present invention. In the arrangement shown in FIG. 13, a distortion aberration correction table 201, a distortion aberration correction amount calculation unit 202, and a distortion aberration correction unit 140 described concerning the arrangement shown in FIG. 10 are added to the arrangement shown in FIG. 1, and a description of each block will be omitted.

In the arrangement shown in FIG. 13, distortion aberration correction by the distortion aberration correction unit 140, rolling shutter distortion correction by a rolling shutter distortion correction unit 141, and image deformation by a geometrical deformation unit to correct a blur are sequentially performed for an image stored in an image memory 125. Note that as for the above-described three kinds of correction, the blocks may sequentially calculate only the image read address from the image memory 125, and the image deformation processes may finally be performed at once.

In this embodiment, when correction by a correction optical system 122 is not performed, all of the reference position of distortion aberration correction, the correction reference position of rolling shutter distortion correction, and the reference position of geometrical deformation are set as the center position of the captured image. As described with reference to FIGS. 4A to 4D, 5A to 5D, and 11A and 11B, the center position on the output image does not move before and after the distortion aberration correction, rolling shutter distortion correction, and geometrical deformation. This can solve the conventional problem of the object position shift and new blur occurrence caused by inappropriately setting the reference line in rolling shutter distortion correction when correction by the correction optical system 122 is not performed.

When correction by the correction optical system 122 is performed, all of the reference position of distortion aberration correction, the correction reference position of rolling shutter distortion correction, and the reference position of geometrical deformation are set as the moved center position. That is, the center position of the captured image when the correction optical system 122 does not deflect the optical axis is set as the position to which the position has moved in accordance with a change in the position of the correction optical system 122. As described with reference to FIGS. 8A to 8D, 9A to 9C, 12A, and 12B, the moved center position on the output image does not move before and after the distortion aberration correction, rolling shutter distortion correction, and geometrical deformation. This can solve the conventional problem of the object position shift and new blur occurrence caused by inappropriately setting the reference line in rolling shutter distortion correction when correction by the correction optical system 122 is performed.

Note that in the above description, the position of the captured image need not always be the center position of the captured image, and need only be set near the position on the captured image perpendicular to the optical axis of the imaging optical system 120. The above description has been made assuming that the position on the captured image perpendicular to the optical axis almost matches the center position of the captured image for the sake of simplicity.

In this embodiment, the correction optical system 122 has been exemplified as the optical image stabilization means.

However, the present invention is not limited to this. Various kinds of image stabilization means are usable, including a method of driving an image pickup device 123 and a method using a prism.

The present invention has been described above based on the preferred embodiments. However, the present invention is not limited to those specific embodiments, and also incorporates various embodiments without departing from the scope of the present invention. For example, image processing such as rolling shutter distortion correction, distortion aberration correction, and geometrical deformation correction may be executed by an image processing apparatus such as a PC for an image captured by the video camera (image capturing apparatus). Some of the above-described embodiments may appropriately be combined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-207529, filed Sep. 20, 2012, which is hereby incorporated by reference herein in its entirety.

What is claimed is:

1. An image processing apparatus for performing image processing for an image captured by an image capturing apparatus including an image capturing unit configured to change, between lines, a timing to receive light of an object image formed by an imaging optical system and accumulate charges, a shake detection unit configured to detect a shake, and an image stabilization unit configured to optically correct an image blur caused by the shake based on an output of said shake detection unit, comprising:
   a storage unit configured to store the image captured by the image capturing apparatus, information of the shake, and a position of the image stabilization unit when capturing the image;
   a distortion correction amount calculation unit configured to calculate, based on the information of the shake stored in said storage unit, a distortion correction amount used to correct a rolling shutter distortion caused in the image by the shake during charge accumulation period of said image capturing unit; and
   a correction unit configured to correct the image stored in said storage unit based on the distortion correction amount,
   wherein said distortion correction amount calculation unit calculates the distortion correction amount using, as a reference, a position set based on the position of said image stabilization unit stored in said storage unit.

2. The apparatus according to claim 1, wherein a reference position for calculating the distortion correction amount is a position of an intersection point of an optical axis of the imaging optical system which moves in accordance with the correction of the image blur and an imaging plane of the image capturing unit.

3. An image processing apparatus for performing image processing for an image captured by an image capturing apparatus including an image capturing unit configured to change, between lines, a timing to receive light of an object image formed by an imaging optical system and accumulate charges, a shake detection unit configured to detect a shake, and an image stabilization unit configured to optically correct an image blur caused by the shake based on an output of said shake detection unit, comprising:
   a storage unit configured to store the image captured by the image capturing apparatus, information of the shake, and a position of the image stabilization unit when capturing the image;
   a distortion correction amount calculation unit configured to calculate, based on the information of the shake stored in said storage unit, a distortion correction amount used to correct a rolling shutter distortion caused in the image by the shake during charge accumulation period of said image capturing unit; and
   a correction unit configured to correct the image stored in said storage unit based on the distortion correction amount,
   wherein said distortion correction amount calculation unit calculates the distortion correction amount such that a position of a reference line of the distortion correction amount when a moving amount of a center of the image stabilization unit exceeds a predetermined value from an optical axis of the imaging optical system becomes away from a center of the captured image than a position of a reference line of the distortion correction amount when a moving amount of a center of the image stabilization unit is not more than the predetermined value from the optical axis of the imaging optical system.

4. The apparatus according to claim 3, wherein the reference line for calculating the distortion correction amount passes an intersection point of an optical axis of the imaging optical system which moves in accordance with the correction of the image blur and an imaging plane of the image capturing unit.

5. A method of controlling an image processing apparatus for performing image processing for an image captured by an image capturing apparatus including an image capturing unit configured to change, between lines, a timing to receive light of an object image formed by an imaging optical system and accumulate charges, a shake detection unit configured to detect a shake, and an image stabilization unit configured to optically correct an image blur caused by the shake based on an output of said shake detection unit, comprising:
   storing the image captured by the image capturing apparatus, information of the shake, and a position of the image stabilization unit when capturing the image;
   calculating, based on the information of the shake stored in the storing, a distortion correction amount used to correct a rolling shutter distortion caused in the image by the shake during charge accumulation period of the image capturing unit; and
   correcting the image stored in the storing based on the distortion correction amount,
   wherein in the calculating, the distortion correction amount is calculated using, as a reference, a position set based on the position of the image stabilization unit stored in the storing.

6. The method according to claim 5, wherein a reference position for calculating the distortion correction amount is a position of an intersection point of an optical axis of the imaging optical system which moves in accordance with the correction of the image blur and an imaging plane of the image capturing unit.

7. A method of controlling an image processing apparatus for performing image processing for an image captured by an image capturing apparatus including an image capturing unit configured to change, between lines, a timing to receive light of an object image formed by an imaging optical system and accumulate charges, a shake detection unit configured to detect a shake, and an image stabilization unit configured to optically correct an image blur caused by the shake based on an output of said shake detection unit, comprising:

storing the image captured by the image capturing apparatus, information of the shake, and a position of the image stabilization unit when capturing the image;

calculating, based on the information of the shake stored in the storing, a distortion correction amount used to correct a rolling shutter distortion caused in the image by the shake during charge accumulation period of the image capturing unit; and correcting the image stored in the storing based on the distortion correction amount, wherein in the calculating, the distortion correction amount is calculated such that a position of a reference line of the distortion correction amount when a moving amount of a center of the image stabilization unit exceeds a predetermined value from an optical axis of the imaging optical system becomes away from a center of the captured image than a position of a reference line of the distortion correction amount when a moving amount of a center of the image stabilization unit is not more than the predetermined value from the optical axis of the imaging optical system.

8. The method according to claim 7, wherein the reference line for calculating the distortion correction amount passes an intersection point of an optical axis of the imaging optical system which moves in accordance with the correction of the image blur and an imaging plane of the image capturing unit.

9. An image processing apparatus for performing image processing for an image captured by an image capturing apparatus including an image capturing unit configured to change, between lines, a timing to receive light of an object image formed by an imaging optical system and accumulate charges, a shake detection unit configured to detect a shake, and an image stabilization unit configured to optically correct an image blur caused by the shake based on an output of said shake detection unit, comprising:

a storage unit configured to store the image captured by the image capturing apparatus, information of the shake, and a position of the image stabilization unit when capturing the image;

a distortion correction amount calculation unit configured to calculate, based on the information of the shake stored in said storage unit, a distortion correction amount used to correct a rolling shutter distortion caused in the image by the shake during charge accumulation period of said image capturing unit; and a correction unit configured to correct the image stored in said storage unit based on the distortion correction amount, wherein said distortion correction amount calculation unit calculates the distortion correction amount using the position of said image stabilization unit stored in said storage unit.

10. The apparatus according to claim 9, wherein a reference position for calculating the distortion correction amount is a position of an intersection point of an optical axis of the imaging optical system which moves in accordance with the correction of the image blur and an imaging plane of the image capturing unit.

11. A method of controlling an image processing apparatus for performing image processing for an image captured by an image capturing apparatus including an image capturing unit configured to change, between lines, a timing to receive light of an object image formed by an imaging optical system and accumulate charges, a shake detection unit configured to detect a shake, and an image stabilization unit configured to optically correct an image blur caused by the shake based on an output of said shake detection unit, comprising:

storing the image captured by the image capturing apparatus, information of the shake, and a position of the image stabilization unit when capturing the image;

calculating, based on the information of the shake stored in said storage unit, a distortion correction amount used to correct a rolling shutter distortion caused in the image by the shake during charge accumulation period of said image capturing unit; and correcting the image stored in said storage unit based on the distortion correction amount, wherein in the calculating, the distortion correction amount is calculated using the position of said image stabilization unit stored in the storing.

12. The method according to claim 11, wherein a reference position for calculating the distortion correction amount is a position of an intersection point of an optical axis of the imaging optical system which moves in accordance with the correction of the image blur and an imaging plane of the image capturing unit.

* * * * *